(12) United States Patent
Lavi et al.

(10) Patent No.: US 12,343,791 B2
(45) Date of Patent: Jul. 1, 2025

(54) ADDITIVE METAL CASTING SYSTEM AND APPARATUS

(71) Applicant: Magnus Metal Ltd., Tzora (IL)

(72) Inventors: Gil Lavi, Ness Ziona (IL); Emil Weisz, Modi'in-Maccabim-Reut (IL); David Scheiner, Savyon (IL)

(73) Assignee: Magnus Metal Ltd., Revadim (IL)

( * ) Notice: Subject to any disclaimer, the term of this patent is extended or adjusted under 35 U.S.C. 154(b) by 38 days.

(21) Appl. No.: 17/748,069

(22) Filed: May 19, 2022

(65) Prior Publication Data

US 2022/0371086 A1 Nov. 24, 2022

(30) Foreign Application Priority Data

May 19, 2021 (IL) .......................................... 283302

(51) Int. Cl.
*B22D 23/00* (2006.01)
*B22D 46/00* (2006.01)
(Continued)

(52) U.S. Cl.
CPC ........... *B22D 23/003* (2013.01); *B22D 46/00* (2013.01); *B33Y 10/00* (2014.12); *B33Y 30/00* (2014.12); *B33Y 50/02* (2014.12)

(58) Field of Classification Search
CPC ...... B22D 23/003; B22D 46/00; B33Y 10/00; B33Y 30/00; B33Y 50/02
See application file for complete search history.

(56) References Cited

U.S. PATENT DOCUMENTS

| 5,207,371 A | 5/1993 | Prinz |
| 5,216,616 A | 6/1993 | Masters |

(Continued)

FOREIGN PATENT DOCUMENTS

| CN | 101449295 | 6/2009 |
| CN | 204135193 | 2/2015 |

(Continued)

OTHER PUBLICATIONS

Machine Translation of CN-110421167-B (Year: 2019).*
(Continued)

*Primary Examiner* — Ricardo D Morales
(74) *Attorney, Agent, or Firm* — Heidi Brun Associates Ltd.; Heidi Brun

(57) ABSTRACT

System and method for additive casting of metal objects by constructing production layers having mold regions and object regions includes a mold construction unit to construct a mold region of the current production layer; a Preparation-Deposition-Post (PDP) unit including: a molten metal depositor to deposit molten metal in an object region; a holder for holding the molten metal depositor; at least one induction heating unit; a build table for supporting the vertical stack of production layers; a movable platform to provide relative movement between the PDP unit and the build table; and a controller for controlling the PDP unit and the movable platform to deposit molten metal in a fabrication area, and to control the PDP unit to perform (1) pre-heating the fabrication area before molten metal deposition, to a pre-deposition temperature, and/or (2) post-heating the fabrication area after molten metal deposition, to a post-deposition temperature.

18 Claims, 12 Drawing Sheets

(51) Int. Cl.
*B33Y 10/00* (2015.01)
*B33Y 30/00* (2015.01)
*B33Y 50/02* (2015.01)

(56) References Cited

U.S. PATENT DOCUMENTS

| | | | |
|---|---|---|---|
| 5,281,789 A | 1/1994 | Merz | |
| 5,286,573 A | 2/1994 | Prinz | |
| 5,301,415 A | 4/1994 | Prinz | |
| 5,301,863 A | 4/1994 | Prinz | |
| 5,398,193 A | 3/1995 | deAngelis | |
| 9,435,211 B2 | 9/2016 | Xu | |
| 9,440,397 B1 | 9/2016 | Fly | |
| 2013/0025810 A1 | 1/2013 | Castle | |
| 2014/0163717 A1 | 6/2014 | Das | |
| 2015/0003995 A1 | 1/2015 | Xu | |
| 2015/0144284 A1 | 5/2015 | Snyder | |
| 2015/0190964 A1 | 7/2015 | Okamoto | |
| 2015/0328681 A1 | 11/2015 | Bullied | |
| 2016/0243619 A1 | 8/2016 | Gothait | |
| 2016/0325541 A1 | 11/2016 | Lavrentyev | |
| 2016/0346831 A1 | 12/2016 | Snyder | |
| 2016/0368046 A1 | 12/2016 | Collins | |
| 2017/0036394 A1 | 2/2017 | Schmehl | |
| 2017/0087632 A1 | 3/2017 | Mark | |
| 2018/0370131 A1 | 12/2018 | Ishikawa et al. | |
| 2019/0118252 A1* | 4/2019 | Bauer | B22F 3/1017 |
| 2019/0319291 A1 | 10/2019 | Cook | |
| 2020/0206810 A1* | 7/2020 | Lavi | B22F 10/64 |
| 2020/0269320 A1 | 8/2020 | Ben-Zur | |

FOREIGN PATENT DOCUMENTS

| | | | |
|---|---|---|---|
| CN | 106626369 | 10/2017 | |
| CN | 107984755 | 5/2018 | |
| CN | 110879195 A | 3/2020 | |
| CN | 110421167 B * | 9/2021 | B22F 10/00 |
| EP | 2998059 A1 | 3/2016 | |
| JP | H10-226803 | 8/1998 | |
| KR | 20170040060 | 4/2017 | |
| WO | 1997009141 | 3/1997 | |
| WO | 2006078342 | 7/2006 | |
| WO | WO-2019053712 A1 * | 3/2019 | B22D 23/00 |
| WO | 2020096951 A1 | 5/2020 | |

OTHER PUBLICATIONS

Scott M. Thompson, Linkan Bian, Nima Shamsaei, Aref Yadollahi, An overview of Direct Laser Deposition for additive manufacturing; Part I: Transport phenomena, modeling and diagnostics, Additive Manufacturing, vol. 8, 2015, pp. 36-62 (Year: 2015).*
Hascoët, JY., Parrot, J., Mognol, P. et al. Induction heating in a wire additive manufacturing approach. Weld World 62, 249-257 (2018). (Year: 2018).*
Weiss, L. et al., "Shape Deposition Manufacturing of Wearable Computers,", 1996 International Solid Freeform Fabrication Symposium, pp. 31-38.
Prinz, M. R. et al., "Shape Deposition Manufacturing." The Robotics Institute and The Engineering Design Research Center Carnegie Mellon University, 1994, 8 pages.
Merz, R., "Shape Deposition Manufacturing," Dissertation, May 16, 1994, 189 pages.
Amon, C. H., et al., "Shape Deposition Manufacturing with Microcasting: Processing, Thermal and Mechincal Issues," Transactions of the American Society of Mechanical Engineers, Series B: Journal of Engineering vol. 120, No. 3. Aug. 1, 1998, pp. 656-665.
Technology overview metal Additive Manufacturing, https://am-power.de/tools/metal-additive-manufacturing/.
Additive Manufacturing New metal technologies, https://tritoneam.com/wp-content/uploads/Ampower-Insights-vol.-6-New-Technologies-1.pdf.
Guide to Managing Risks Associated With Foundry Work, https://www.safeworkaustralia.gov.au/system/files/documents/1702/guide-managing-risks-associated-foundry-workl.pdf.
International Search Report for corresponding application PCT/IB2022/054669 mailed on Sep. 12, 2022.
Supplementary European Search Report mailed in corresponding European application 22845555 on Oct. 28, 2024.

* cited by examiner

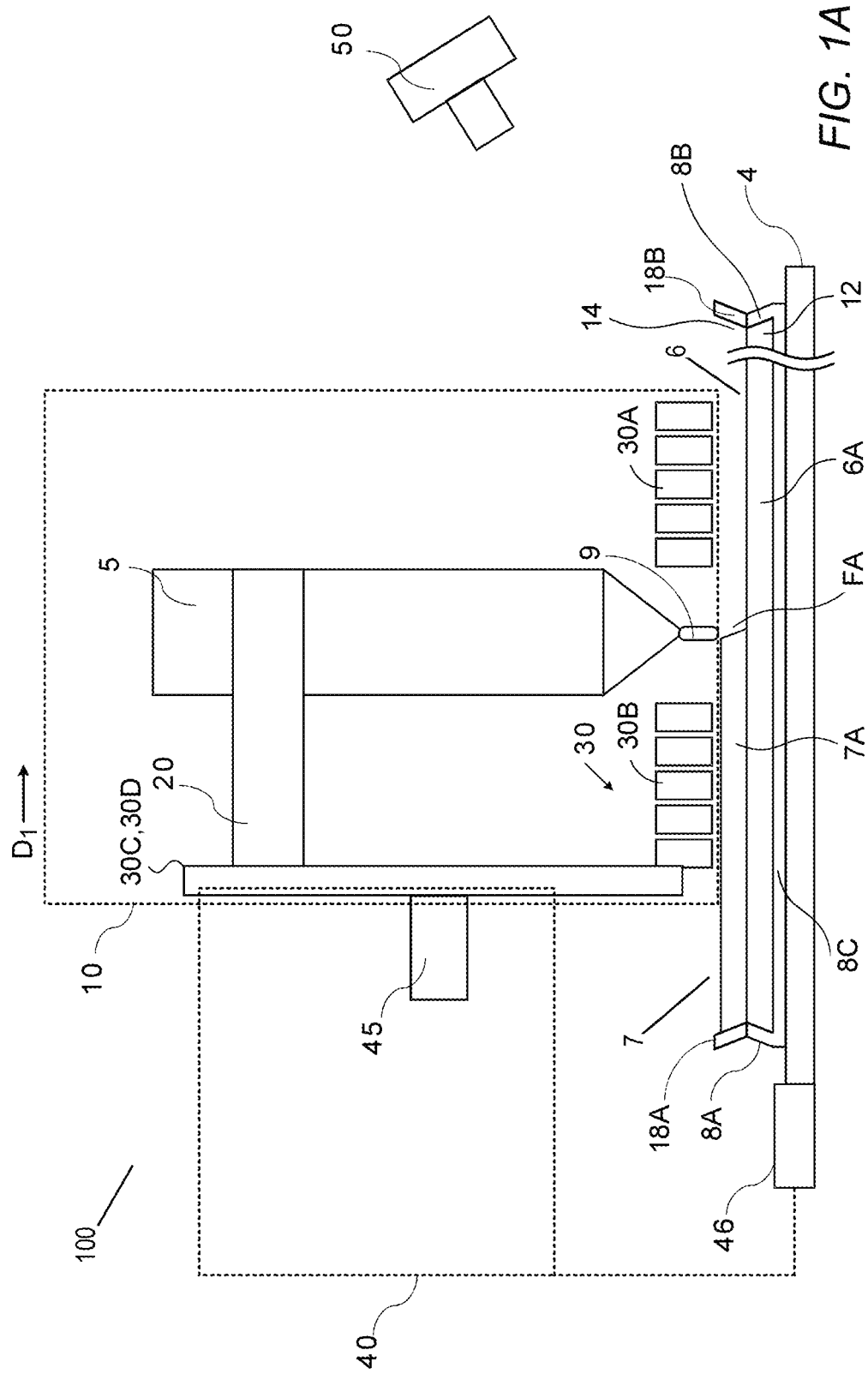

| Coupon | Elements | | |
|---|---|---|---|
| | Manganese (Mn) | Silicon (Si) | Iron (Fe) |
| Cast 1 vertical 3 | 0.7 | 2.6 | Bal |
| Cast 1 vertical 7 | 0.7 | 2.8 | Bal |
| Cast 1 vertical 11 | 0.7 | 2.9 | Bal |
| Cast 1 upper layer 1 | 0.7 | 2.8 | Bal |
| Cast 1 upper layer 3 | 0.7 | 2.8 | Bal |
| Cast 1 bottom layer 1 | 0.7 | 2.8 | Bal |
| Cast 1 bottom layer 3 | 0.7 | 2.9 | Bal |
| Cast 3 vertical 3 | 0.7 | 2.7 | Bal |
| Cast 3 vertical 7 | 0.7 | 2.7 | Bal |
| Cast 3 vertical 11 | 0.7 | 2.8 | Bal |
| Cast 3 bottom layer 3 | 0.7 | 2.7 | Bal |
| Cast 3 bottom layer 1 | 0.7 | 2.8 | Bal |
| Cast 3 upper layer 1 | 0.7 | 2.7 | Bal |
| Cast 3 upper layer 3 | 0.7 | 2.7 | Bal |
| Ref. Grey cast iron | 0.25-1.0 | 1.0-3.0 | Bal. |

*FIG. 6D*

ADDITIVE METAL CASTING SYSTEM AND APPARATUS

CROSS REFERENCE TO RELATED APPLICATIONS

This application claims priority from IL patent application 283302, filed May 19, 2021, for which a substitute specification was filed on Nov. 29, 2021, both of which are incorporated herein by reference.

TECHNICAL FIELD

The present invention relates to metal casting in general, and, in particular, to apparatus for additive metal casting.

BACKGROUND

Most of the demand for cast metal products is currently met by traditional casting techniques, which involve the production of complete molds followed by the filling of the mold cavities with molten metal. In some cases, the production of molds includes fabricating a casting pattern, from which the mold is made.

Problems with Traditional Metal Casting

Production and management of casting patterns and molds contributes significantly to the costs and turn-around times of traditional casting. Fabricating patterns and molds is both expensive and time-consuming, and using them in ongoing casting operations introduces the need for cleaning, maintenance, repair, and reconditioning of molds and patterns.

Long-term storage and inventory of patterns and molds can incur further significant expenses and management burdens. This effort may be justified for large-scale production of a particular cast metal part, but in an aftermarket situation, when market demand for that particular part diminishes, it may be difficult to justify the ongoing overhead of maintaining molds and patterns for production of that part. When it becomes prohibitively expensive to continue manufacturing the part, the part's replacement availability typically becomes limited to existing inventories.

Traditional mold-based casting has further shortcomings: Large or complex castings often require molds with multiple pouring cups, runners, risers, and extensions, which account for a significant percentage of excess mold volume, in many cases this can increase the amount of molten metal required for a casting by as much as 50%. Although the excess metal may normally be remelted and reused, the energy expended in melting the excess metal is wasted. Another disadvantage of traditional casting is that particularly large or complex parts cannot always be cast in a single piece, thereby requiring welding and/or bolting of smaller parts together after casting.

Further disadvantages of traditional casting relate to the industrial safety hazards inherent in the process of handling and manipulating large amounts of molten metal, the high temperatures involved, and the toxic fumes typically accompanying the process. Along with the immediate safety hazards to manufacturing personnel, there are also issues of pollution and other detrimental environmental effects, all of which can have widespread and long-lasting consequences.

Advantages of Additive Metal Casting

The above-noted limitations of traditional casting have motivated the development of various techniques for direct additive metal castings. Additive metal casting has the potential to obviate the problems and restrictions associated with patterns and molds as discussed previously and promises to confine molten metal to more easily managed amounts and extents in contained local environments to improve safety and minimize the effects of environmental hazards.

Current additive manufacturing systems are described inter alia in the following published articles: "Shape Deposition Manufacturing", by Merz et al., in *Proceedings of the 1994 International Solid Freeform Fabrication Symposium*, pages 1-8; "Shape deposition manufacturing of heterogeneous structures", by Weiss et al., in *Journal of Manufacturing Systems*, Volume 16, Issue 4, 1997, pages 239-248; and "Shape Deposition Manufacturing With Microcasting: Processing, Thermal and Mechanical Issues", by Amon et al., in *Journal of Manufacturing Science and Engineering*, Transactions of the ASME, August 1998, 120(3), pages 656-665. Of additional interest is the Technical University of Vienna published doctoral dissertation (in English) of Robert Merz, entitled *Shape Deposition Manufacturing*, dated May 1994.

Shortcomings of Current Additive Metal Casting Technology

While potentially solving the mold and pattern-related problems of traditional casting, however, current additive metal casting technology introduces its own restrictions and limitations:

Limited Throughput, Casting Size, and Product Quality Issues

In terms of production flow, current additive metal casting techniques typically have limited throughput, and have proven difficult to scale to large part sizes and masses.

Additionally, as noted in the above-cited Merz dissertation, current additive metal manufacturing is often characterized by casting defects, including prevalent macroscopic voids. Such defects render additively cast products unsuitable for use in many applications.

Restrictions on Metals and Metal Sources

Currently, metal additive manufacturing is generally based on direct-deposition technologies and powder bed fusion technologies utilizing laser and electron beams. In current use are the following technologies: Laser-Based Powder Bed Fusion, Laser Powder Deposition, Electron Beam Powder Bed Fusion, Wire Electric/Plasma Arc Deposition, Wire Electron Deposition, Directed Energy Deposition (DED), and Binder Jetting. Other direct deposition and sintered-based technologies are available at earlier stages of development and adoption. These technologies, however, are often limited to low melting-point metals and sometimes require manufacturers to switch their familiar raw metal stock to metal powder-based sources.

There is thus a need for an additive metal casting system and apparatus that overcomes the above-noted limitations, and which facilitates economical and efficient throughput in cast metal manufacturing of high quality and uniformity, based on established and certified sources of higher melting-point metal source stock. These goals are met by the present invention.

SUMMARY

According to embodiments of the invention, there is provided a casting system for casting a metallic object by constructing a series of production layers forming a vertical stack of production layers, wherein production layers of the series have mold regions, wherein production layers of the series have object regions (regions for molten metal deposition, or regions in which molten metal, now solidified, were previously deposited) defined by the mold regions (i.e., object regions are defined by surfaces of mold cavities in the mold regions), and wherein a current production layer (i.e., a production layer that is currently being fabricated) is constructed upon a top surface of a previous production layer (i.e., the top surface of a production layer that was previously fabricated) in the vertical stack, the system including: a mold construction unit operative to construct a mold region of the current production layer; a Preparation-Deposition-Post treatment (PDP) unit including: a molten metal depositor operative to deposit molten metal in an object region defined by the mold region of the current production layer; a holder attached to the molten metal depositor, for holding the molten metal depositor; at least one induction heating unit attached to the holder; a build table, for supporting the vertical stack of production layers; a movable platform to provide relative movement between the PDP unit and the build table, wherein the relative movement is along a progression direction; and a controller for controlling the PDP unit and the movable platform to deposit molten metal in a fabrication area of the object region of the current production layer, and to control the PDP unit to perform at least one of: pre-heating the fabrication area before molten metal deposition, to a pre-deposition temperature, and post-heating the fabrication area after molten metal deposition, to a post-deposition temperature.

According to some embodiments of the invention, which can be combined with other embodiments described herein, the system further includes a controller to control the induction heating unit to perform the pre-heat, heat and post-heat to affect solidification parameters of a melted area in the object region of a previous production layer and the area in the object region of a current production layer.

In related embodiments, the system further includes a controller to control the induction heating unit to perform the pre-heat, heat and post-heat to affect parameters of cooling an area in the object region of a current production layer.

The induction heating unit may include a single induction heating coil having, with respect to the progression direction, a leading section and a trailing section, and, along the progression direction, the leading section may pre-heat the fabrication area in the object region of a previous production layer, and the trailing section is to post-heat the fabrication area in the object region of a current production layer.

According to a related embodiment, the induction heating unit has at least one coil with a substantially planar circular shape.

The induction heating unit may have a substantially planar elliptical shape with a major axis parallel to the progression direction. The induction heating unit may have a substantially planar elliptical with a major axis perpendicular to the progression direction.

The induction heating unit may have a substantially conic shape oriented so that the conical apex is closer to the fabrication area than the conical base is to the fabrication area, during operation of the additive casting system.

According to some embodiments of the invention, which can be combined with other embodiments described herein, the induction heating unit includes one or more induction heating coil windings, wherein each coil winding may include multiple turns. The induction heating unit may include multiple windings having a first density of turns (number of turns per unit distance) in a first portion of the induction heating coil and a second density of turns in a second portion of the induction heating coil, where the second density is higher than the first density.

The induction heating unit may have a central axis that is perpendicular to the build table. The induction heating unit may be tilted in an angle with respect to the build table during operation of the additive casting system.

Some embodiments further include a controller to control the provision of electric power to the induction heating unit, wherein controlling the provision of electric power includes controlling at least one of: current level, current amplitude, current polarity, timing, duration, alternating current (AC) frequency, and AC phase.

In various embodiments, which can be combined with other embodiments described herein, the molten metal unit includes a metal rod, wherein the induction heating melts a tip of the rod. In some embodiments of the invention, which can be combined with other embodiments described herein the molten metal unit features a crucible for containing metal which is heated and melted by the induction heating unit.

The movable platform may include at least one of: a movable unit to move the PDP unit and a movable support configured to move the build table.

A holder may include a rotating unit for rotating the molten metal depositor. The holder may include an actuator for moving a metal source rod in a vertical axis during operation of the casting system. It is important to note that the holder not only holds the molten metal depositor (which is attached to the holder), but the holder is also attached to the PDP unit, which includes one or more induction heating units. That is, the molten metal depositor is physically connected to the induction heating units via the holder. The molten metal depositor and the induction heaters therefore move together, being joined by the holder.

A related embodiment provides a molten metal feeder for providing new molten metal to the molten metal depositor.

The mold construction unit may be a mold deposition unit with a mold material reservoir of unhardened mold material in fluid connection with the mold deposition unit, for additively depositing mold material in mold regions of the production layers predefined by the building plan.

In some embodiments of the invention, which can be combined with other embodiments described herein, mold construction is accomplished by a mold construction unit containing a reserve of remotely-constructed mold components and including a mold transfer unit, for transferring the mold components from the reserve to mold regions in the production layers predefined by the building plan.

The system may further include a production chamber to accommodate the build table and at least the PDP unit during object region production and the mold construction unit during mold region construction. The production chamber may be maintained at a first temperature during object region production and at a second temperature, different from the first temperature, during mold region construction. In a related embodiment, the production chamber provides an inert atmosphere environment.

The production area may be maintained as an inert environment during object region production.

According to another aspect of the invention, there is provided a method for casting an object by additively constructing production layers on a build table following a building plan, the production layers having object regions defined by mold regions, the method comprising, with a Preparation-Deposition-Post treatment (PDP) unit having a molten metal depositor, a holder for holding the molten metal depositor, and induction heating unit connected to the holder: constructing mold regions of the current production layer on a build table following a building plan and thereafter, while providing relative movement between the PDP unit and the build table, providing electric power to the induction coil, for heating a portion of the molten metal depositor to deposit metal in a fabrication area in the object region of a current production layer and for performing at least one of: pre-heating an area in the object region of a previous production layer to a first temperature, and post-heating an area in the object region of a current production layer to a second temperature.

The method may further include repeating the constructing, pre-heating, heating and post-heating following the building plan.

The constructing may include depositing mold material from a reservoir of mold material by a mold deposition unit, in fluid connection with the mold material reservoir. The constructing may include transferring remotely-fabricated mold components from a reserve of remotely-fabricated mold components by a mold transfer unit to mold regions in the production layers predefined by the building plan.

The method may further include controlling the provision of electric power by controlling at least one of: current level, current amplitude, power level, current polarity, timing, duty cycle, power factor, alternating current (AC) frequency, and altering current (AC) phase.

Providing electric power may include optionally providing a first electric power level for pre-heating the area in the object region of the previous production layer; providing a second electric power level for melting metal in a portion of the molten metal depositor; and optionally providing a third electric power level for post-heating the area in the object region of the current production layer.

The first electric power level may be determined based on the electromagnetic (EM) energy required to heat the area in the object region of the previous production layer to the first temperature; the second electric power level may be determined based on the EM energy required to melt metal in a portion of the molten metal depositor; and the third electric power level may be determined based on the EM energy required to heat the area in the object region of the current production layer.

The method may further include one or more of: providing vertical movement to the molten metal depositor and controlling a working distance between molten metal depositor and the object region of the previous production layer (according to various embodiments of the invention, the controller can change the relative position of a PDP unit to ensure that the working distance is larger than the height of the mold region of the current production layer, as well as to change the relative position of a PDP unit according to the thickness of a production layer); determining a required molten metal deposition rate; controlling at least one of a speed and a direction of the relative movement between the PDP unit and the build table; determining a molten metal deposition profile, and controlling at least one of: a vertical position of the molten metal depositor, a speed of the molten metal depositor, an electrical power level provided to the induction heating unit, wherein the controlling is based on the molten metal deposition profile; measuring a temperature of a portion of the molten metal depositor and controlling at least one of: the vertical position of the molten metal depositor, a speed of the molten metal depositor, an electrical power level provided to the induction heating unit, wherein the controlling is based on the measured temperature; heating an area in the object region of a previous production layer such that a width of a pre-heated area formed by an induction heating unit during pre-heating of the previously cast metallic layer is 5%-50% wider than the width of a molten metal line cast on top of the pre-heated line.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1A is an illustration of an additive casting system according to some embodiments of the invention;

FIG. 6A through FIG. 6F depict results of a metallurgical evaluation conducted on coupons of cast objects manufactured in accordance with embodiments of the present invention.

Figure 1B:
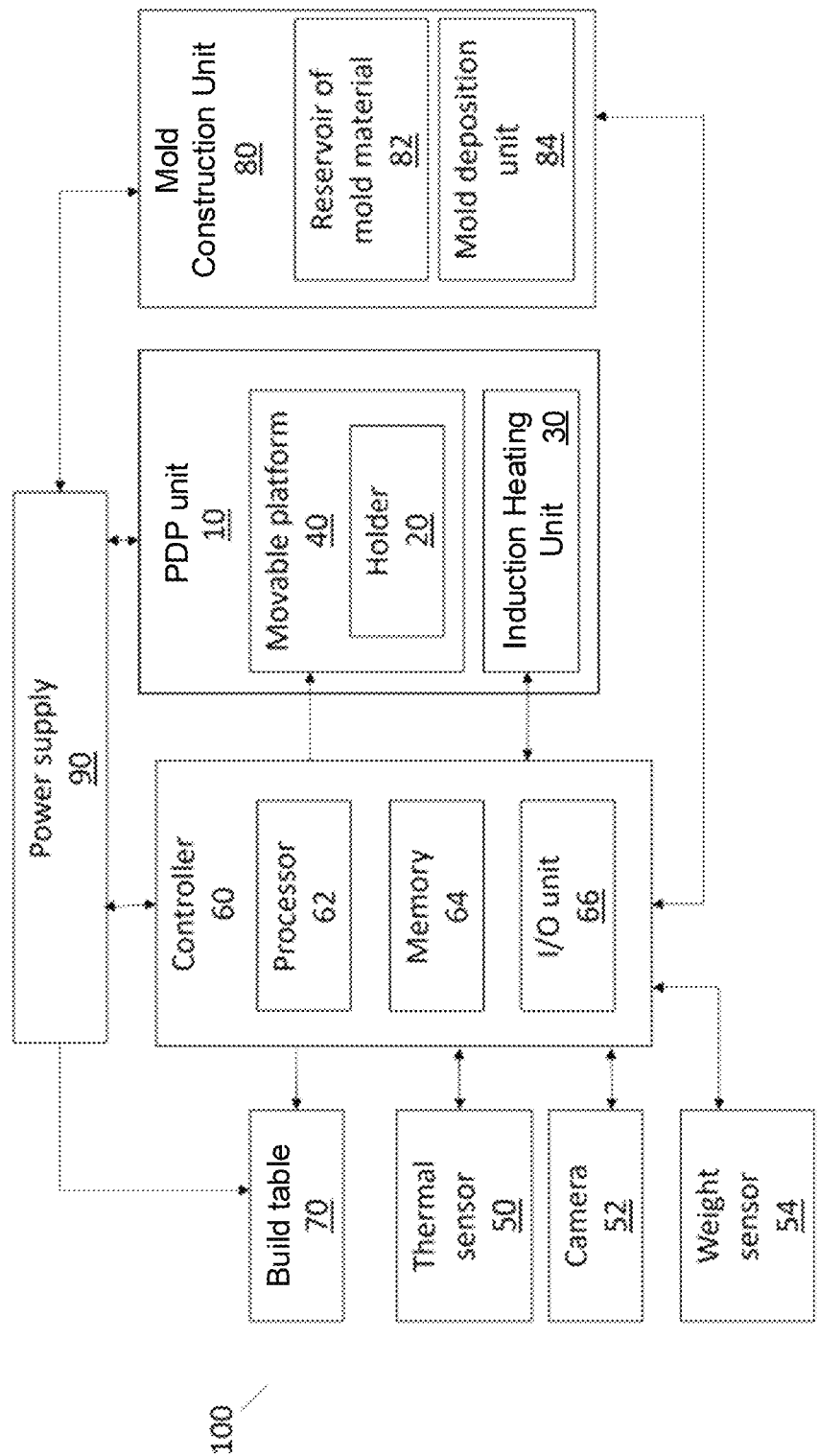
FIG. 1B is a block diagram of the additive casting system of FIG. 1A according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are outlined in order to provide a thorough understanding of the invention. However, it will be understood by those skilled in the art that the present invention may be practiced without these specific details. In other instances, well-known methods, procedures, and components have not been described in detail to obscure the present invention.

Metal additive manufacturing approaches aim to enable complex design with high resolution and accuracy of the final part, obviate the need for mold preparation and use, expedite lead time, and elevate manufacturing safety.

According to embodiments of the invention, there are provided systems and methods for digitally planned and controlled additive metal casting. According to embodiments of the invention, the use of patterns is obviated. According to embodiments of the invention, the use of additional mold features such as pouring cups, runners, risers, and extensions is obviated. According to embodiments of the invention, additive manufacturing concepts are implemented in a novel manner for casting. The manufacture of the metal object is planned as a sequence of multiple operations, executed production layer by production layer. In each operation, a production layer including a mold region and an object region is constructed. According to embodiments of the invention, the production layers are built on a build table by a group of dedicated production units that travel over the production area (X-Y plane defined by the build table). The travel of the production units over the X-Y production plane may be a continuous travel or discrete (in jumps).

The group of production units for implementing production operations may include several or all of the following units:

a mold construction unit (in a non-limiting example, a mold deposition unit for depositing unhardened mold material for a mold region of a production layer);

a mold finishing unit for processing the mold region before molten metal deposition;

a pre-metal deposition unit (in a non-limiting example, for surface treatment and/or preparation)—the pre-metal deposition unit may also be referred to herein as "pre-processing" unit;

a molten metal deposition unit for fabricating the object region of the production layer. The object region is deposited in an area defined by the mold region;

a metal post-processing unit for post-processing the metal region; and a production layer post-processing unit for post-processing of the production layer before proceeding to the production of the next production layer.

The production units may be moved by robotic arms, moving stage, or other means. The invention is not limited by the type and kind of motion actuator for the X-Y motion.

Before proceeding to the next production layer, the relative displacement of the build table and the production units is adjusted. For example, the height of the build table is adjusted in the Z-direction or by adjusting the production unit height. This is done in connection with various operations, and in some cases is done according to thickness of the current production layer. The invention is not limited by the type and kind of motion actuator for the Z motion.

Part or all of the production units may travel over the build table in a continuous manner or a discrete manner (jumps), thereby defining a plurality of fabrication areas or local fabrication areas.

According to an embodiment of the invention, the pre-metal deposition unit, metal deposition unit, and metal post-processing unit are physically connected to each other and share a travel mechanism. The combined module of pre-deposition (pre-processing), deposition, and post-deposition (post-processing, post-treatment) is referred to as 'metal PDP unit', where the letters PDP stand for "Preparation, Deposition, and Post-treatment".

According to embodiments of the invention, some preparation and post-treatment operations are realized using induction heating. The preparation operation may be realized as pre-heating at the area of a previously-fabricated production layer adjacent to the fabrication area, and the post-treatment may be realized as post-heating an area of a current production layer adjacent to the fabrication area.

The fabrication area, the area of a previous production layer, and the area of a current production layer constitute a melt pool that solidifies in a homogeneous manner. For example, a melt pool of a few millimeters (5, 10, 50, 100) up to a few centimeters (1, 2, 3, 4, 5, 10, 15) in length is created.

In some embodiments, the combined operation of metal heating, pre-heating, and post-heating is required for proper casting with perfect bonding between the already cast object layer to the next one in large area models while moving. In this fashion, additive casting according to embodiments of the invention assures homogeneous bonding with uniform and isotropic micrograin structure throughout the cast product, eliminating the casting voids and other defects of current additive processes, as noted in the prior art references previously cited.

In some embodiments, which can be combined with other embodiments described herein, pre-heating is applied to melt the area in the previous production layer. Metal heating is applied for melting the metal and facilitating its deposition at the proper temperature. Post-heating is applied to enable controlled cooling of the resultant metal area.

Depending on various operational aspects, the operation of pre-heating may be obviated. For example, in case the previous production layer suffers no (or little) surface oxidation. Further, in some cases, the bonding between the currently-deposited material and the previously deposited layer may be solely based on the post-heating.

Depending on various operational aspects, the step of post-heating may be omitted. In a non-limiting example, there is the case in which a desired thermal profile can be achieved without heating, e.g., with cooling or without applying additional heating.

According to embodiments of the invention, parameters of at least the pre-heating, heating, and post-heating are controlled. For example, the temperature, duration, thermal profile, and additional parameters are controlled to generate a desired cooling profile of the melt pool.

In some embodiments, the post-deposition treatment by itself or in combination with the global environmental temperature control is used for controlling the crystallographic structure and phase of the deposited metal. In some embodiments, an additional global heating and/or cooling operation is applied to the part after a sequence of production layer fabrication operations is provided.

According to embodiments of the invention, some preparation and post-treatment operations are realized using a single induction heating unit. The function of the single induction heating unit as 'preparation' or 'post-treatment' depends on the direction of travel.

The post-treatment may further be realized as cooling.

Further yet, the post-treatment may include the addition of materials into the area of the current production layer.

The post-treatment may include surface alignment or flattening, for example, using mechanical and/or magnetic means.

According to embodiments of the invention, the mold (also called a 'shell') serves as a delineator of the shape of the object region of the production layer. A portion of the mold region may surround the object region to create a boundary contour into which the object material will be laid. Portions of the mold region may serve as temporary support for overhanging sections of the object region as they are deposited. Similarly, portions of the mold region may temporarily support overhanging sections of the mold region.

The invention is not limited by the mold type and mold building technique. According to an embodiment of the invention, mold regions are directly laid on the build table using additive techniques such as 3D (3 dimensional) printing. According to another embodiment of the invention, mold regions layers are fabricated away from the build table and are mounted on the build table layer by layer.

Due to the use of mold regions (shells), higher metal deposition flow rates are feasible, comparing other additive metal casting techniques. Continuous metal deposition is enabled by allowing each deposited portion (for example, a drop) to flow within the boundaries defined by the mold regions. As a result, higher production throughput may be achieved. For example, in the non-powder, no-mold metal additive Direct-Energy-Deposition (DED) technique, the deposition thickness is at the order of 1, 2, or 3 mm, giving rise to production rates of 1-3 kg. in 20 hours. According to embodiments of the invention, 500-1000 kg. or more may be deposited in 20 hours.

According to embodiments of the invention, the production layers may be fabricated in a controlled and closed environment: the build table—along with production layers additively generated on it—is placed within a production chamber. The production units—in all or in part—may be placed within the closed environment or allowed access to the closed environment. By placing the build table within a closed environment and carrying out various production operations within the closed environment, a higher level of production control and safety may be achieved.

In some embodiments, which can be combined with other embodiments described herein, the production chamber includes one or more heaters for attaining the desired temperatures therein. Temperatures in the production chamber are adjusted to address one or more of the following considerations:

temperature differences between the object region of the current production layer and the object region of the previous production layer;
temperature differences between the mold region of the current production layer and the mold region of the previous production layer;
temperature differences between the mold region and the object region of the current production layer;
desired drying/hardening rates of mold regions;
desired solidification rates of object regions; and
planned thermal pre-processing and post-processing to be applied on mold regions and/or object regions of the current production layer.

In some embodiments, which can be combined with other embodiments described herein, the build table includes one or more build table heaters, and the controller is operative to heat and maintain the build table at predetermined table temperatures. For example, for the production of gray iron objects, a table temperature may be held constant in the range of 500 to 750 degrees centigrade. In related embodiments, build table heaters provide heat for pre-heating and/or post-heating.

In some embodiments the controller is further operative to heat the build table to a first build table temperature for mold region construction and to a second build table temperature, different from the first build table temperature, for object region production.

According to embodiments of the invention, the global temperature of the chamber, the build table, and/or the part during the part's fabrication is monitored and controlled. For example, a furnace may be used for circulating hot air; the build table may be heated; the build table may include a heater and more. The invention is not limited by the type and kind of global temperature control.

Some Advantages of the Present Invention

By controlling the production chamber temperatures, build table temperatures and casting temperatures according to embodiments of the invention, one or more of the following properties and characteristics may be enhanced: mold stability; interactions between mold regions within a single production layer or between mold regions of different production layers; homogeneity of object regions both macroscopically and in the grain microstructure; isotropic bulk properties of cast objects; and freedom from casting defects.

In some embodiments of the invention, the system may operate in an open atmospheric environment. According to other embodiments of the invention, the production environment may be maintained as a sealed inert atmospheric environment during part or all of the production operations. The inert atmospheric environment may be realized in several ways, non-limiting examples of which include: use of a sealed production chamber, semi-sealed production chamber, or unsealed local-environment provided adjacently to the production spots. The invention is not limited by the realization of the inert atmospheric environment.

According to embodiments of the invention, mold removal is performed globally after completing all of the production layers.

Additional Advantages and Benefits of the Invention

As noted previously, many of the current additive metal casting processes require manufacturers to discontinue using their regular sources of raw material and switch to using powdered metal sources. An advantage of the invention is that it allows manufacturers to continue using their regular certified raw materials as input.

Another advantage of the invention is in facilitating the automation of casting operations, which currently require the involvement and supervision of skilled personnel, not only in production-line casting, but also in the preparation of patterns and molds. As experience and skilled labor becomes more difficult to find, fully-automated additive metal casting systems, such as those supported by the invention, will become more and more necessary.

Reference is now made to FIG. 1A, which is an illustration of an additive casting system 100 according to some embodiments of the invention. The additive casting system 100 is to fabricate a metal object additively. The object is fabricated production layer by production layer: a previously cast production layer 12, including metal region 6 and mold region 8—represented by mold region cross-sections 8A and 8B is shown. Current production layer 14, including an object region 7A and mold region 18—represented by mold region cross-sections 18A and 18B—is shown. During the fabrication of a production layer 14, object region 7A and optionally mold region 18 are fabricated additively in a sequential manner: during a metal deposition operation, molten metal is deposited in a fabrication area FA.

Not shown in FIG. 1A are the system units responsible for the construction of the mold regions.

An additive casting system 100 may include a metal PDP (Preparation-deposition-post-treatment) unit 10 and a movable platform 40, holding PDP unit 10, and configured to provide a relative movement between PDP unit 10 and a build table 4. For ease of explanation, PDP unit 10 is shown as moving along direction $D_1$ on a travel plane defined by build table 4. During the travel of PDP unit 10 along direction $D_1$ on a travel plane, a sequence of fabrication areas FA is defined, and molten metal is deposited therein. For clarity of illustration and explanation, only one fabrication area FA is explicitly shown.

In some embodiments, the movement of PDP unit 10 may include continuous travel. Depending on parameters such as deposition flow, the speed of travel, and other factors, discrete drops may be deposited. In another embodiment having other parameters requiring a higher deposition flow, a continuous jet or stream of molten metal is deposited. In further embodiments, discrete deposition is performed using step-wise movement in a series of move-stop actions.

In some embodiments, the planar movement may include running PDP unit 10 back and forth in rows or columns linearly along the plane defined by the build table (Cartesian-type of movement). Movable platform 40 may be realized in Cartesian coordinates with right-angle frames and linear axes (not shown). Movable platform 40 may also be realized as a Delta system, employing multiple arms attached to vertical rails. Other motion technologies may be used, such as Selective Compliance Assembly Robot Arm (SCARA), H-bot, CoreXY, and others. In some embodiments, the movement of PDP unit 10 may be realized using polar coordinates, circulating PDP unit 10 over the surface. The invention is not limited by the motion type and technique.

In some embodiments, PDP unit 10 may include a holder 20 for holding a molten metal depositor for providing molten metal/melt 9. A metal rod 5 is shown in FIG. 1A as a non-limiting example.

In some embodiments, movable platform 40 may include a connector 46 for connecting the movable platform to the build table 4.

In some embodiments, the thickness of each object region, for example, object regions 6 and 7, may be 1-30 mm.

In some embodiments, the first fabricated production layer, directly placed onto build table 4, is composed of only the mold region 8C.

During mold fabrication and object fabrication operations, the mold region may be slightly higher than the planned thickness of the object region—this is illustrated in FIG. 1A by the slight difference between the height of cross-section 18A and the upper surface of the object region 7. The height difference between the mold region 18 and object region 7 may be provided to avoid metal spill off during object region fabrication or for accommodating object regions, fabricated by several travels of the metal deposition unit over the same or adjacent fabrication spots and supported by a previously fabricated mold region (not shown in FIG. 1).

In some embodiments, movable platform 40 may include at least one of: a movable unit 45 configured to move the metal deposition unit, and a movable support 46 configured to move build table 4. In some embodiments, movable support 46 may be configured to move build table 4 with respect to movable unit 45 and the metal deposition unit. In some embodiments, build table 4 may be configured to move in at least one axis (e.g., vertical direction), two axes (e.g., in a horizontal plane), or in all three axes.

In some embodiments, system 100 may be configured to provide relative movement between PDP unit 10 and build table 4 in one, two or three axes by controlling the movement of the movable unit 45 and/or movable support 46. The invention is not limited by the manner in which the relative movement between build table 4 and the metal deposition unit is realized.

In some embodiments, PDP unit 10 includes a rotation unit, providing rotation of PDP unit 10 around its symmetry axis. In some embodiments, a tilt angle between the PDP unit and the build table is provided. For example, PDP unit 10 may include a tilt unit, enabling the tilt of PDP unit 10 with respect to the build table. The internal motion of units within PDP unit 10, for example, shifting one or more induction heating units in the z-axis, is also a possibility. The invention is not limited by the manner the rotation movement and the tilt angle are realized.

In some embodiments, a PDP unit further includes induction heating unit 30. In related embodiments, induction heating unit 30 is configured to: (1) pre-heat a previously-fabricated object region 6A in production layer 6 adjacent to the current object fabrication spot SP in production layer 7 to a first temperature; (2) melt a portion of metal rod 5 using the inner sides of portions 30A, 30B of induction heating unit 30; and (3) post-heat object region 7A in the current production layer 7 to a second temperature.

In the embodiment of the invention illustrated in FIG. 1A, the following construction units, described above, are realized as the molten metal depositor having rod 5 and induction heating unit 30: the pre-processing metal production unit—section 30A of induction heating unit 30; the metal deposition production unit—rod 5, heated by inner portions of induction heating unit 30, and the metal post-processing unit—section 30B of induction heating unit 30.

With respect to a cross-section of induction heating unit 30 (for example, axis AA shown in FIG. 2), which is parallel to the progression direction $D_1$, certain embodiments provide induction heating unit 30 with a leading portion 30A and a trailing portion 30B. Leading portion 30A pre-heats the previously fabricated object region 6A in production layer 6 adjacent to the current object fabrication spot SP in production layer 7 to a first temperature, and trailing portion 30B post-heats object region 7A in the current production layer 7 to a second temperature.

According to the present invention, it is critical to focus closely on the fabrication area, where the molten metal—either in droplet form or in the form of a narrow molten metal stream—meets the previously-deposited metal which has solidified. This small area (on the scale of millimeters) is where the added metal becomes part of the cast object. The Applicant has realized that shortcomings of current additive technology may arise due to the lack of attention to this small but critical region. Current additive processes rely on the thermal energy of the added molten metal to bond it to the previously-deposited metal, but this is inadequate to properly control the metallurgical transition from the liquid phase to a fully-integrated solid phase, and results in poor bonding, irregular grain microstructure, anisotropic properties, and other casting defects. Embodiments of the invention overcome these problems by providing an integrated PDP unit, which not only deposits the additive molten metal, but also precisely controls the thermal properties of both the additive molten metal and the target region of the solidified metal. The precise control enables to reduce or eliminate thermal shock and allows the molten metal to seamlessly integrate and bond with the pre-existing metal. In order to do this, embodiments of the invention provide a PDP unit that closely combines both deposition and thermal heating for coordinated processing of small areas on the scale of millimeters. A key feature of the PDP unit according to embodiments of the present invention is maintaining the close physical proximity of the molten metal deposition unit and coordinated heating units within the integrated PDP unit. By physically joining these crucial sub-units in this way, system errors associated with independent deposition and heating units are minimized and reduced to the matter of direction and speed of the PDP unit's motion over the target object. A small amount of time necessarily elapses between pre-heating the target area and the deposition of the added molten metal. Physical coupling the molten metal depositor to the heating units in the PDP unit according to present invention allows precise control over this small time-interval, to minimize its effects. Relevant parameters may involve the geometry of the molten metal depositor-heater combination, and the path, speed, and direction of the PDP unit's motion. According to related embodiments of the invention, these parameters can be varied along with properly-configured scanning patterns and careful compensation in the working distance of the PDP unit over the fabrication areas, to attain superior metallurgical conditions that are conducive to the desired bonding and integration of the added metal into the existing metallic object.

During operation, the following activities are carried out sequentially over multiple fabrication areas, as applicable, one fabrication area after another. Each of the molten metal depositor units passes over the fabrication area and its vicinity at a different time, one after the other: while moving, portion 30A of induction heating unit 30 pre-heats part of production layer 6. Heat is transferred to the vicinity of the preheated area. Thereafter, molten metal depositor with rod 5 reaches the preheated area—fabrication area FA and deposits the metal. Then 30B is traveling above this area and post-heats it. Optionally, additional post-treatment is applied, for example, cooling and non-thermal treatment operations.

As the PDP unit moves over an object region being produced, a continuous melt pool trail and continuous molten metal deposition may be created. In a fabrication area, the melt pool cools down after PDP unit pre-heating, as the molten metal depositor approaches and moves above the fabrication area. In some embodiments, heating above the melting point is provided to compensate for this cool-down of the fabrication area between the passage of the pre-heater and the arrival of the molten metal depositor.

According to embodiments of the invention, a portion of object region 6A is pre-heated by portion 30A of induction heating unit 30 to a temperature above melting point; the portion of object region 6A is melted—at least its top surface—to form a melt pool with a depth of approximately 1 mm. Then, molten metal depositor with rod 5 goes over the melt pool (the preheated portion of object region 6A) and deposits molten metal on top of the pre-heated portion of object region 6A. Then, portion 30B of induction heating unit 30 is moving over the fabrication area—now constituting a portion of object region 7A, for post heat. The post-heating may support the joining of the currently deposited metal to the previously deposited metal portions. Post heating may also control the cooling-process of the metal.

In operation, object regions 6A and 7A that are adjacent to fabricating area FA are locally liquefied. When molten metal is deposited onto fabrication area FA, the deposited molten metal mixes with the previously deposited metal in object regions 6A and 7A creating seamless bonding. After the molten metal depositor moves away, the deposited metal cools down by heat transfer from object regions 6A and 7A to the bulk of previously-deposited (and now solidified) metal below.

As the sequence of pre-heating-metal deposition-post-heating is carried out on the multiple fabrication areas (spots), the current object production layer solidifies.

Induction heating unit 30 is controlled by a controller (controller 60 shown in FIG. 1B). Controller 60 may control the timing of the operation, the duty cycle, the temperature, and additional operating parameters. In various embodiments, controller 60 is implemented via a digital control system, an analog control system, or a combination thereof.

The term "controller" herein denotes any automated device for carrying out, operating and/or controlling a process, including general-purpose computing, data processing devices, and mobile data communication/processing devices, as well as dedicated controllers and dedicated controlling devices embedded in equipment, apparatus, systems, and data communication/processing networks. It is understood that methods of the invention may be carried out by, or be under the direction of, controllers or similar devices according to executable instructions, commands, and/or data in the form of executable programs, subroutines, and computing/data processing device applications embodied as software and/or firmware contained in non-transitory data storage devices.

In some embodiments, the second temperature generated for induction heating unit 30 is the same as the first temperature. In other embodiments, the second temperature is higher than the first temperature.

Induction heating unit connectors 30C and 30D may be connected to holder 20 and/or movable unit 45.

Figure 2A:
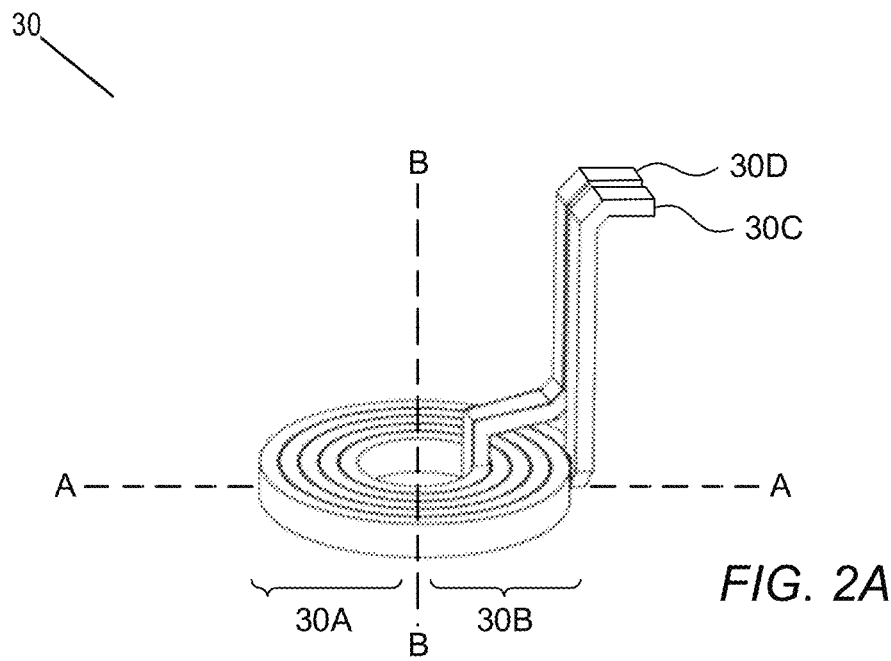
FIGS. 2A-2D are illustrations of coil arrangements according to some embodiments of the invention.

Induction heating unit 30 may have various suitable shapes or forms. In some embodiments, induction heating unit 30 is realized as a planar "pancake" type induction heating coil, as illustrated in FIG. 2A. The central hole of induction heating unit 30 is larger than the diameter of rod 5 being melted. For example, induction heating coil 30 may be a 5-turn pancake coil with a copper pipe of a rectangular cross-section. The copper pipe cross-section may be 10×20 mm. In some embodiments, rod 5 diameter may be about 45 mm, and the diameter of the central hole of induction heating coil 30 may be about 60 mm. In other embodiments, the hole in the induction heating unit doesn't have to be larger than rod 5: the drops from the molten tip of rod 5 will flow on the surface of the conic tip and drop to the fabrication area through the center.

According to embodiments of the invention, illustrated in FIG. 2A, induction heating unit 30 is composed of a symmetrically configured induction heating coil. As a non-limiting example, a substantially planar circular coil ("pancake") with 5 turns is shown. Induction heating unit 30, being part of the PDP unit 10, can be moved in any direction in the production plane. Due to its symmetrical arrangement, any portion of the circular induction heating coil ("pancake') may operate as the leading portion 30A or trailing portion 30B with respect to the progression direction of the PDP unit.

Figure 2B:
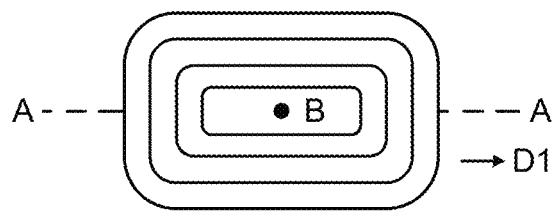
Figure 2D:
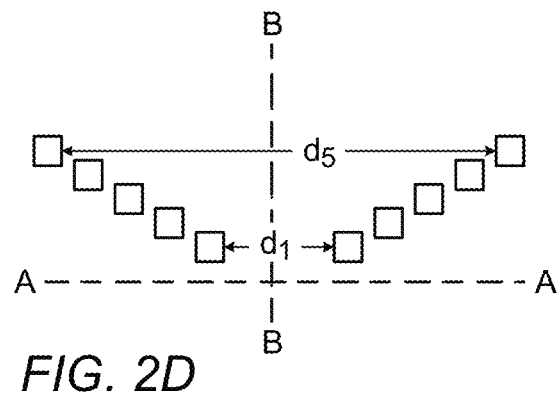
Figure 2C:
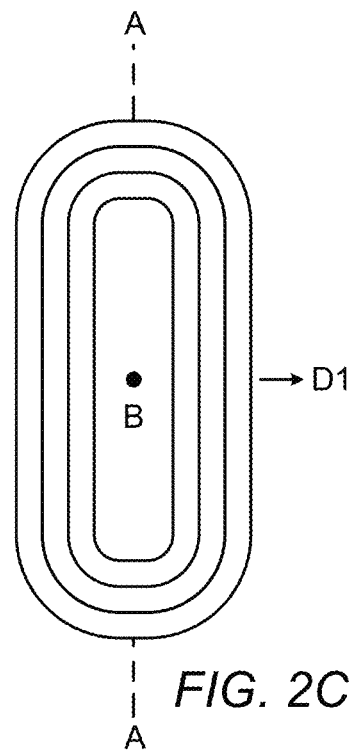

According to other embodiments of the invention, illustrated in a non-limiting manner in FIGS. 2B and 2C, induction heating unit 30 is arranged in an oval shape, having symmetry with respect to a preferred axis, and defining preferred portions of the induction heating unit as 'leading' and 'trailing' with respect to the progression direction. In such a configuration, the induction heating unit and/or the PDP unit may be provided with suitable motion degrees of freedom (for example, around axis BB shown in FIG. 2A) to cover the entirety of the production layer.

FIG. 2D is a cross-section of induction heating unit 30 according to another embodiment: induction heating unit 30 may include a coil having a substantially conic shape oriented such that a smaller diameter $d_1$ of the coil is closer to the fabrication area than the larger diameter of the coil $d_5$ is to the fabrication area during operation of the additive casting system.

In yet another embodiment, induction heating unit 30 may include one or more production layers, and each production layer includes a plurality of turns (not illustrated).

In some embodiments, a plane defined by the flat pancake shape (plane A-A shown in FIG. 2) is parallel to the production plane defined by the build table (element 4 in FIG. 1A). A central axis B-B of induction heating unit 30 may be perpendicular to plane A-A, as illustrated in FIGS. 1A and 2.

In yet another embodiment, induction heating unit 30 may be tilted at an angle (e.g., 1-30 deg.) with respect to a horizontal plane (e.g., the upper surface of production layers 6 or 7) during operation of additive casting system 100. In such a case, when movable platform 20 moves tilted induction heating coil 30, a portion of induction heating unit 30 positioned closer to the horizontal plane is acting as the 'leading' portion, providing pre-heating.

In yet another embodiment, induction heating unit 30 may include a plurality of eccentric turns having a first density of turns in a first portion of induction heating unit 30 and a second density of turns in a second portion of induction heating unit 30, higher than the first density. In such a case, the energy density coupled to a metal layer by the second portion of induction heating unit 30 may be higher than the energy density coupled by the first portion of induction heating unit 30 for the same current.

The shape of the induction heating unit is not limited to a doughnut topology. For example, induction heating unit 30 may include a set of two hair-pin coils, making 30A and 30B two independent induction heating units. According to another example, the induction heating unit may include 'split-n-return' coils.

The induction heating units may include one or more magnetic flux concentrators (MFCs) to amplify the magnetic field density. Heat sinks for the magnetic flux concentrators (MFCs) may also be used. The invention is not limited by the type, shape, and design of the magnetic flux concentrators and heat sinks that may be used.

In some embodiments, the size, width, height, material, structure, number of turns, and the distance of induction heating unit 30 from production layers 6 and 7 may be determined in order to control the magnetic energy coupling between induction heating coil 30 and rod 5 and production layers 6 and 7.

For example, the size of the central hole of induction heating unit 30 may be determined to optimize the magnetic energy coupling between induction heating coil 30 and rod 5 in order to provide a controlled melting of rod 5.

In another embodiment, when induction heating unit 30 is positioned substantially horizontally to the surface of production layers 6 and 7, the energy coupling between induction heating coil 30 and new production layer 7 may be higher than the energy coupling between induction heating coil 30 and previous production layer 6, since production layer 7 is closer to induction heating coil 30 than production layer 6.

In yet another embodiment, in order to improve the energy coupling between production layer 6 and induction heating coil 30, induction heating unit 30 may be tilted (as discussed herein above), shortening the distance between the lower face of induction heating coil 30 and production layer 6.

In the above-described embodiments, induction heating unit 30 was described as being realized using a single induction heating coil. The invention is not limited by the number of induction heating coils used, and multiple induction heating coils may be used to constitute the various embodiments of induction heating unit 30, with the appropriate modifications.

In some embodiments, movable platform 40 may include an X-Y build table, robotic arm, servo motors, gears, connectors, and the like that may allow moving PDP unit 10 in at least two axes, for example, the horizontal X-Y plane, during operation of casting system 100.

In some embodiments, movable platform 40 may further be configured to move PDP unit 10 also in the Z direction, tilt PDP unit 10 at a predetermined angle, and the like.

In some embodiments, the internal motion of induction heating unit 30 within PDP unit 10 may be provided. For example, induction heating unit 30 may be shifted in the z-axis.

In some embodiments, movable platform 40 may be configured to move induction heating coil 30 over the production layer for performing consecutive serial operations. Movable platform 40 may perform a first planar movement over the surface of the object region of production layer 6 for preheating the object region of production layer 6 prior to the deposition of the object region of production layer 7. For example, rod 5 may be lifted up outside the heating area defined by the inner side of portions 30A, 30B. Movable platform 40 may perform a second planar movement over the object region of production layer 6, after lowering rod 5, for melting and depositing molten metal to cast the object region of production layer 7. Movable platform 40 may then perform a third planar movement over the object region of production layer 7 for post treating object region of production layer 7, for example, after lifting rod 5, in order to join together object region of production layers 6 and 7.

In some embodiments, holder 20 may include a rotating unit (e.g., an electric motor and a gear) for rotating rod 5 in order to provide an even melting of rod 5. In some embodiments, holder 20 may include an actuator for moving the rod in a vertical axis during operation of the additive casting system. The actuator may include any unit configured to provide vertical movement to rod 5 during operation of system 100. The actuator may include a motor and a gear assembly configured to transfer rotational movement from the motor (e.g., an electric motor) to a vertical movement of rod 5.

In some embodiments, system 100 may include a feeder, not illustrated, for providing, in the case of a molten metal depositor in the form of a rod, a new metal rod 5 to holder 20, when rod 5 reaches a minimum length (e.g., 100 mm).

The invention is not limited by the type of molten metal depositor that is used. For ease of explanation, the invention was described with reference to a molten metal depositor in the form of a metal rod (element 5 in FIG. 1A), but this is not necessarily so. According to one embodiment, a crucible is used. The crucible may receive solid metal or molten metal. The crucible may receive heat generated, e.g., by induction heating unit 30 shown in FIG. 1A.

The invention is not limited by the shape and size of the molten metal depositor. For ease of explanation, the invention was described with reference to the deposition of metal drops by the molten metal depositor. According to another embodiment, the molten metal depositor may be shaped like a trough, giving rise to faster deposition of metal over a larger area comparing drop deposition.

In some embodiments, system 100 may further include at least one sensor 50, for example, an IR camera or pyrometer for measuring the temperature of the tip of rod 5, molten metal 9, object regions of production layer 6, and/or production layer 7. In some embodiments, system 100 may further include other sensors, such as visible-wavelength cameras, pyrometers, weight sensors 54 (e.g., rod or crucible weight sensor and/or build table weight sensors), stereometric vision sensors (e.g., for measuring production layer thickness), and the like.

Reference is now made to FIG. 1B, which is a block diagram of the additive casting system of FIG. 1A according to some embodiments of the invention. In some embodiments, system 100 may include PDP unit 10 and movable platform 40, as discussed with reference to FIG. 1A. System 100 may further include a controller 60 for controlling the controllable units of system 100. Controller 60 may include any processing unit, such as processor 62 configured to execute methods, codes, and instructions according to embodiments of the invention. The methods, codes, and instructions may be stored in non-transitory memory 64, for example, instructions to control various controllable components of system 100 (e.g., motors, a power supply (e.g., a power supply 90), sensors (e.g., sensors 50, 52, 54), etc.). Memory 64 may further include any data related to the operation of casting device 100, for example, 3D models of parts and/or molds. In some embodiments, controller 60 may further include any input/output (I/O) unit 66 for communicating with external devices, for example, power supply 90, thermal sensor 50, camera 52, the weight sensor 54, external computing devices, and the like. I/O unit 66 may include any communication unit, user interface devices, and the like.

In some embodiments, system 100 may further include a power supply 90, configured to provide AC electric power of frequency range, for example, between 10 kHz and 400 kHz and maximum power, for example, of 200 kW, to at least one induction heating coil 30, electrical power to the electronic components and drivers, of movable platform 40, electrical power to the electronic components and drivers of the rotating unit and vertical motion actuator of holder 20 and/or sensor 50.

In some embodiments, controller 60 may be configured to control the provision of electric power to at least one induction heating coil. In some embodiments, controlling the provision of the electric power may include controlling at least one of the current level, current amplitude, current polarity, timing, duration, and current AC frequency.

In some embodiments, controller 60 may control power supply 90 to provide induction heating coil 30 a first electric power level for pre-heating metal layer 6. In a nonlimiting example, when the casted metal is cast iron, and the induction heating unit is as illustrated in FIG. 2A, power supply 90 may provide induction heating coil 30 with 30 kW at 115 kHz. In some embodiments, controller 60 may control power supply 90 to provide induction heating unit 30 a second electric power level for melting rod 5. In the non-limiting example, when rod 5 is a 45 mm diameter cast iron rod, power supply 90 may provide induction heating unit 30 with 40 kW at 115 kHz. In some embodiments, controller 60 may control power supply 90 to provide induction heating coil 30 a third electric power level for post-heating metal layer 7. In a non-limiting example, when the casted metal is cast iron, and the induction heating unit is as illustrated in FIG. 2A, power supply 90 may provide induction heating coil 30 with 35 kW at 115 kHz.

Figure 4A:
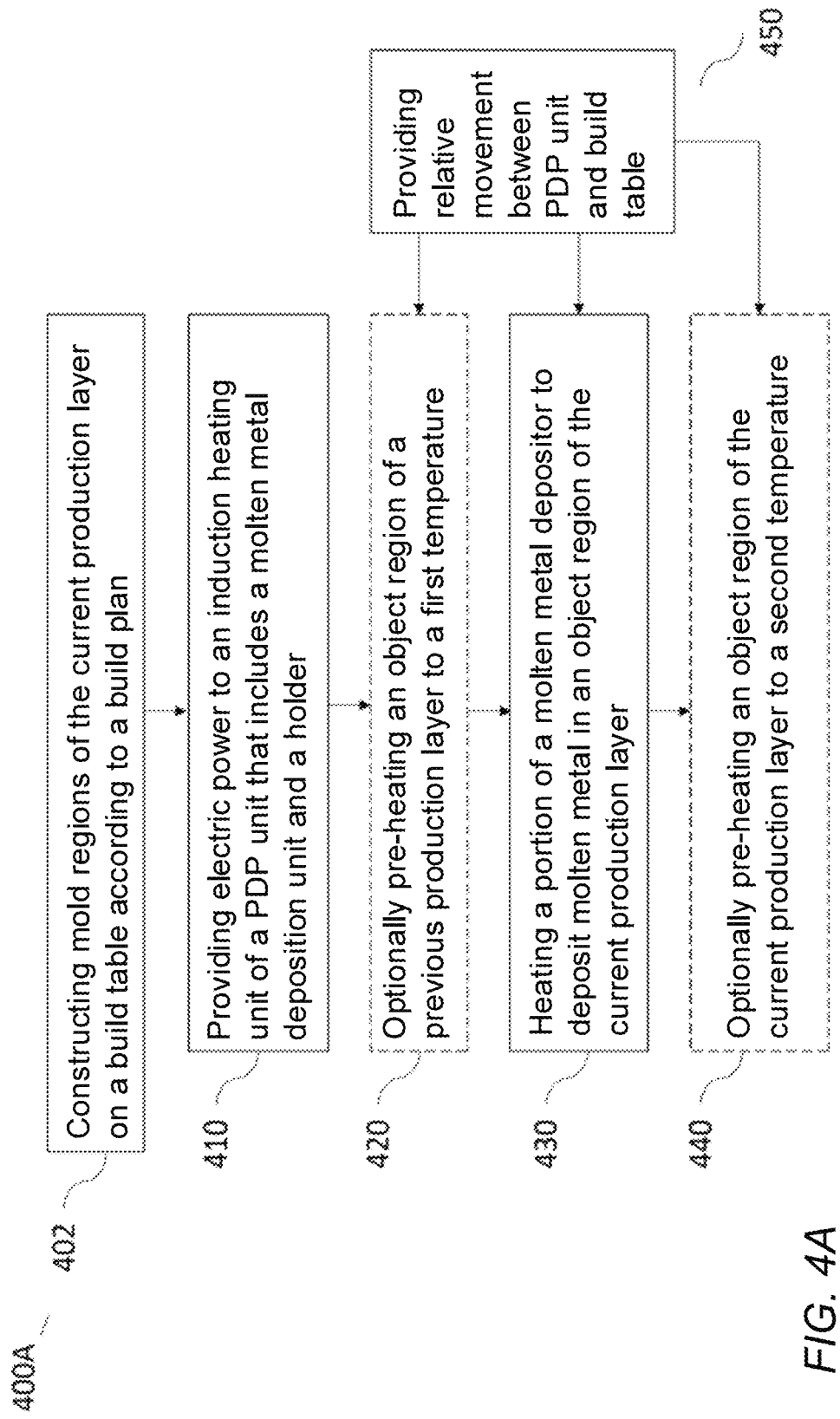
FIGS. 4A and 4B are flowcharts of methods for the additive casting of metallic objects according to some embodiments of the invention.

In some embodiments, other aspects of the operation of system 100 may also be controlled by controller 60, as broadly discussed with respect to the method of FIG. 4A.

In some embodiments, system 100 further includes a mold construction unit for fabricating the mold regions. According to embodiments of the invention, the mold construction unit is a mold deposition unit that fabricates the mold regions in an additive manner, for example, using 3D (three-dimensional) printing techniques. The mold construction unit may include a reservoir of mold material in paste form and a mold deposition unit, in fluid connection with the mold material reservoir, for additively depositing mold material in mold regions of the production layers.

In other embodiments, the mold regions may be fabricated by remotely-fabricated mold layers, for example employing sand or ceramic mold techniques. The mold construction unit may be realized as a mold transfer unit with a reserve of remotely-fabricated mold components for transferring hardened and finished mold components from the reserve to mold regions in the production layers predefined by the building plan.

The mold construction unit may be connected to or equipped with a movable unit to move over the build table and fabricate the mold regions as predefined by the building plan. The invention is not limited by the realization of the movement of the mold construction unit. For example, movable unit 40 illustrated in FIG. 1A may be connected to the mold construction unit to move it for the fabrication of the mold regions.

In some embodiments, as illustrated in FIG. 1B, system 100 may further include a mold construction unit 80. Mold construction unit 80 may be configured to deposit mold portions, for example, mold portions 8A and 8B of mold 8. In some embodiments, mold construction unit 80 may include a reservoir of mold material 82 in paste form and a mold deposition unit 84, in fluid connection with the mold material reservoir, for additively depositing mold material at predefined mold regions. In some embodiments, mold deposition unit 84 may include one or more liquid introduction ports (e.g., nozzles, spouts, and the like) for pouring at least one liquid substance. In other embodiments, mold deposition unit 84 may be in fluid connection and/or may include a reservoir of mold material 82 containing the mold material. In further embodiments, the reservoir of mold material 82 may be any tank, cartridge, and magazine configured to hold the mold material. In related embodiments, the reservoir of mold material 82 may include a stirrer for stirring the mold material in the reservoir of mold material 82 prior to the deposition.

In certain embodiments, mold deposition unit 84 may be coupled to movable unit 40 or to an additional movable unit (not illustrated in FIGS. 1A-1B) for moving mold deposition unit 84 over build table 4, for example, in at least two axes.

In various embodiments, controller 60 may control mold deposition unit 84 and the movable unit to deposit mold portions such as 8A, 8B, 18A, and 18B shown in FIG. 1A.

In some embodiments, power supply 90 may provide power to mold deposition unit 84 and the movable unit.

In some embodiments, the mold material may include or may be any material suitable for being deposited or printed from mold deposition unit 84 and provide a shape for a specific liquid material being poured into the mold after the mold deposition.

In some embodiments, the mold material may include granular material mixed with a binder and configured to hold molten metal at elevated temperatures. The granular material may include ceramic powders (e.g., zirconia, alumina, magnesia, etc.), sand, clay, metallic powders, and any combination thereof. In some embodiments, the mold material may further include activation additives. For example, UV absorbing particles, crosslinking agents, heat-absorbing particles, and the like.

In some embodiments, different production operations are carried out at different temperatures. For example, controller 60 is to facilitate a first temperature for the metal deposition unit and facilitate a second temperature for mold deposition unit 84. For example, the temperature of the metal deposition unit, in the case of iron casting, may be 1100, 1200, or 1300 degrees Celsius, while the operating temperature of the mold deposition unit 84 may be around 350, 450, 600 degrees Celsius.

Figure 3A:
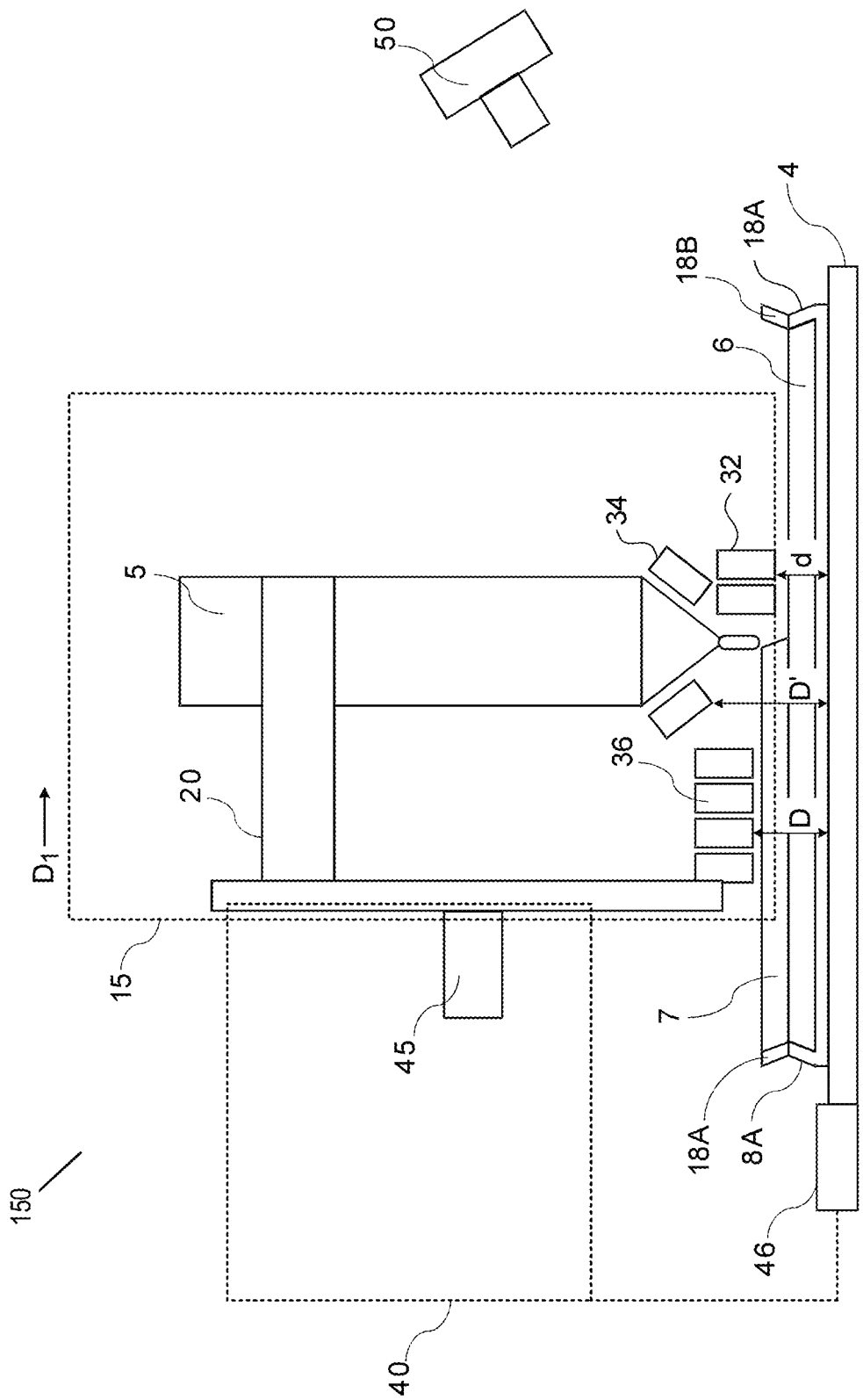
FIG. 3A is an illustration of an additive casting system according to some embodiments of the invention.

Reference is now made to FIG. 3A, which is an illustration of an additive casting system 150 according to some embodiments of the invention. With respect to FIG. 1A, like elements are given like reference numerals. System 150 differs from system 100 shown in FIG. 1A in the design of the PDP unit 15.

An additive casting system 150 may include a PDP deposition unit 15 and a movable platform 40 holding the PDP unit 15 and configured to provide a relative movement between PDP unit 15 and build table 4, for example, along at least two axes. Movable platform 40 of system 150 may be substantially the same as movable platform 40 of system 100 shown in FIG. 1A.

PDP unit 15 may include a first induction heating unit 32 for preheating a portion of a casted object region of a previously processed production layer (e.g., metal region of production layer 6), a second induction heating coil 34 for melting metallic rod 5, and a third induction heating coil 36 for post-heating a portion of the current object region of the current production layer (e.g., production layer 7). Holder 20 may be substantially the same as holder 20 of system 100 and may include the same additional components, such as a rotating unit for rotating rod 5 and/or an actuator for moving rod 5 in a vertical axis.

In some embodiments, the internal motion of one or more induction heating units 32, 34, 36 within PDP unit 10 may be provided. For example, the pre-heating induction heating unit 32 and/or the post-heating induction heating unit 36 may be shifted in the z-axis.

In some embodiments, similarly to system 100, system 150 may include a feeder (not illustrated) for feeding new rods 5 to holder 20.

In some embodiments, movable platform 40 may include a connector 46 for connecting the movable platform to build table 4.

Induction heating units 32, 34, and 36 may be realized using a single coil or multiple coils in various shapes. In some embodiments, induction heating units 32, 34, and 36 may have any of the shapes and configurations disclosed above concerning induction heating unit 30. For example, second induction heating unit 34 may have a substantially conic shape oriented so that the apex of the coil is closer to the fabrication area than the base of the coil is to the fabrication area during operation of the additive casting system. In another example, induction heating units 32 and 36 may be realized using "pancake" coils, as described in FIG. 2A, or with hairpin-type coils.

In some embodiments, at least one of the first induction heating unit 32, second induction heating unit 34, and third induction heating unit 36 may include one or more coil windings; wherein each coil winding may include one or more turns. In some embodiments, first induction heating unit 32 may be assembled such that a lower surface of the first induction heating unit 32 is located at a first distance d from build table 4; the third induction coil 36 unit is located at a second distance D from build table 4, larger than the first distance d, during operation of the casting system, as illustrated. In some embodiments, second induction heating unit 34 may be assembled such that a lower surface of the coil is located at a third distance D' from build table 4, larger than the first distance d and the second distance D, during operation of the casting system, as illustrated. In some embodiments, the difference in height between D and d is essentially equivalent to the thickness of the deposited object region of production layer 7, whereby the height of induction heating unit 32 above the previous object region of production layer 6 is essentially equivalent to the height of the third induction heating unit 36 above the deposited object region of production layer 7. In some embodiments, the height difference between the induction heating units may be varied, for example, to facilitate different deposited metal thicknesses.

In various embodiments, the working distance of the PDP unit above a fabrication area is adjustable to accommodate changing working conditions.

In some embodiments, system 150 may include at least one thermal sensor 50, similarly to the one of system 100. In some embodiments, system 150 may further include other sensors, such as visible-wavelength cameras, pyrometers, weight sensors (e.g., rod weight sensor and/or build table weight sensors), stereometric vision sensors (e.g., for measuring production layer thickness), distance sensors (e.g., for measuring and maintaining d and D) and the like.

Figure 3B:
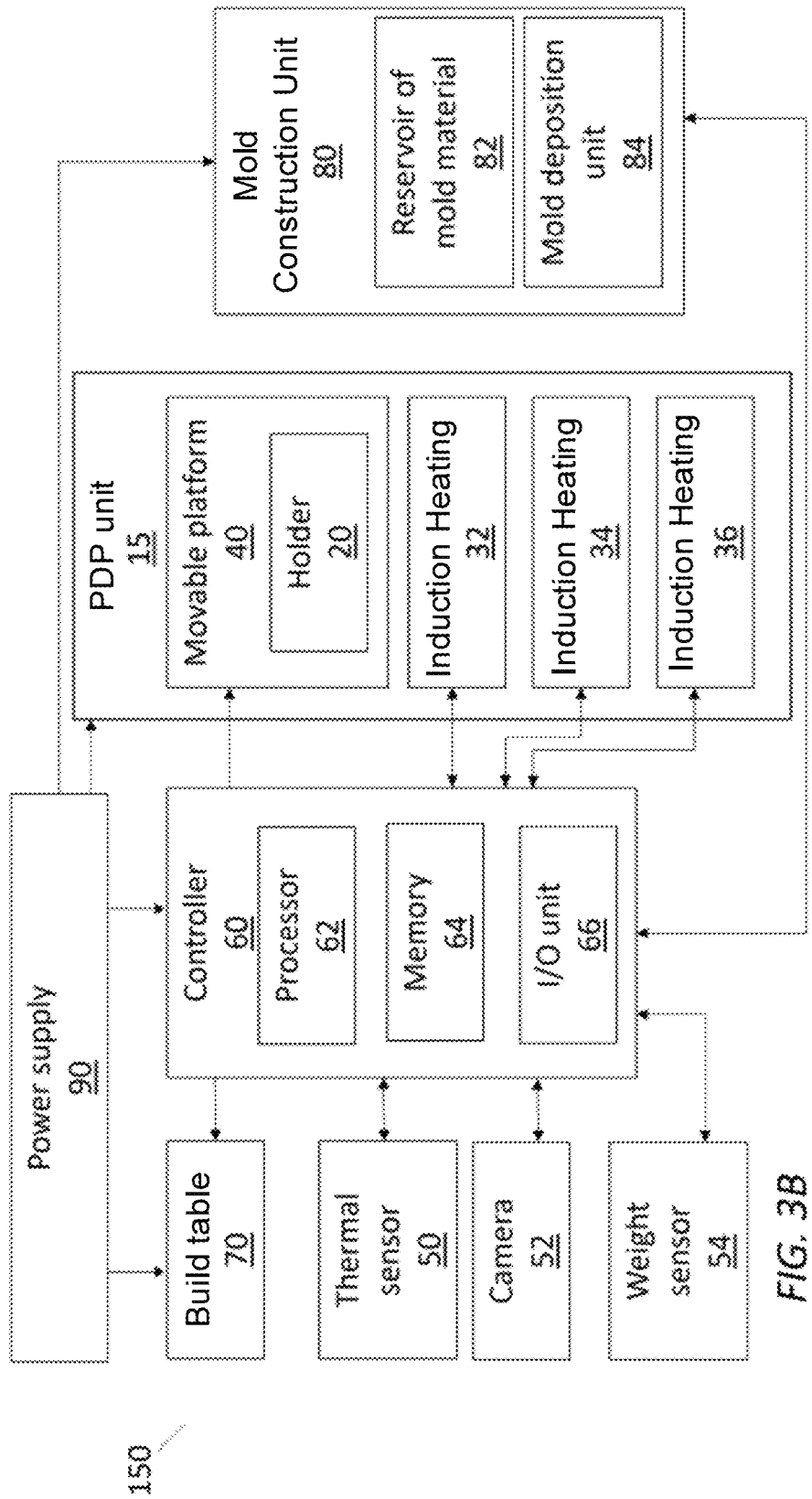
FIG. 3B is a block diagram of the additive casting system of FIG. 3A according to some embodiments of the invention.

FIG. 3B is a block diagram of the additive casting system of FIG. 3A according to some embodiments of the invention. In some embodiments, system 150 may further include a controller 60, a power supply 90, and a mold construction unit 80, which are substantially the same as controller 60, power supply 90, and mold construction unit 80 of system 100.

In some embodiments, controller 60 may be configured to control the provision of electric power, from power supply 90, to at least one of first induction coil 32, second induction coil 34, and third induction coil 36. In some embodiments, controlling the provision of the electric power may include controlling at least one of the current level, current amplitude, current polarity timing, duration, and current AC frequency. In a nonlimiting example, when depositing cast iron, first coil 32 may be provided with 30 kW at 115 kHz, second coil 34 may be provided with 40 kW at 115 kHz, and third coil 36 may be provided with 35 kW at 115 kHz.

Reference is now made to FIG. 4A, which is a flowchart of a method 400A of the additive casting of metallic objects according to some embodiments of the invention. Method 400A may be performed by system 100 shown in FIG. 1A, employing at least one induction heating unit.

In a step 402: constructing mold regions of the current production layer on a build table following a building plan. In some embodiments, the method may first include providing a first mold portion, for example, mold portion 8A, on top of build table 4. In some embodiments, the provision may include depositing first mold portion 8A on build table 4, using mold deposition unit 84. In such case, mold deposition unit 84 may deposit (e.g., print) mold portion 8A production layer by production layer. Alternatively, preformed mold portion 8A may be placed on build table 4. In some embodiments, preformed mold portion 8A may be made from ceramic material or from condensed sand.

In a step 410: electric power may be provided to at least one induction coil. An induction coil 30 is shown in FIG. 1A, in the case of a single induction heating unit, forming part of a PDP unit, together with a molten metal depositor and a holder (elements 10, 5, 20 shown in FIG. 1A). For example, controller 60 (shown in FIG. 1B) may control power supply 90 to provide power to induction heating unit 30 as required to at least one of the current level, current amplitude, current polarity timing, duration, and current AC frequency. In some embodiments, at each stage in the additive casting process, controller 60 may provide different power levels to coil 30.

At least steps 420, 430, and 440 are performed while, at a step 450, a relative movement between the PDP unit and the build table is provided.

In step 420, while the PDP unit travels over the build table: pre-heating an area in the object region of a previous production layer to a first temperature. For example, induction heating unit 30 may be provided with a first electric power level for preheating areas of the previous production layer 6.

In some embodiments, movable platform 40 may planarly move induction heating unit 30 during the preheating process in order to ensure even heating of production layer 6. In some embodiments, movable platform 40 may move induction heating unit 30 in the vertical direction in order to ensure optimal magnetic energy coupling between induction heating unit 30 and production layer 6. In some embodiments, movable platform 40 may tilt induction heating unit 30 towards or away from production layer 6, in the planar movement progression direction in order to optimize the energy coupling. In some embodiments, induction heating unit 30 may be pre-tilted, and platform 40 may provide induction heating unit 30 a planar movement.

In some embodiments, at least one of the provided power level, the duration, the distance between previous production layer 6 and the lower surface of induction heating unit 30, the tilting angle of induction heating unit 30, and the planar velocity of platform 40 may be selected to preheat production layer 6 to a predetermined first temperature.

In some embodiments, predetermined first temperature may be higher than the melting temperature of the metal of production layer 6. For example, for ferrous alloys, the determined first temperature may be 50° C. above the melting temperature of metal layer 6. In some embodiments, controller 60 may receive temperature measurements taken from the surface of layer 6 from sensor 50 (e.g., IR camera, pyrometer or other) and may adjust at least one of the provided power level, the duration, the distance between layer 6 and the lower surface of induction heating unit 30, the tilting angle of induction heating unit 30 and the planar velocity of platform 40 based on the received measurements.

In step 430: heating a portion of a molten metal depositor to deposit metal on a fabrication area in the object region of the current production layer. For example, a molten metal depositor such as rod 5 shown in FIG. 1A may be melted for casting newly casted metallic object regions, for example, on top of object regions of the previous production layer. For example, power supply 90 may provide the same electric power level or a second electric power level to induction heating unit 30 for melting the tip area of rod 5. In some embodiments, the second electric power level may be determined based on the EM energy required to melt the tip area of the rod. In some embodiments, additional parameters may control the type of melt 9 flow provided by melting rod 5. Melt 9 may be provided as a continuous, controlled flow of molten metal. Alternatively, melt 9 may be provided in molten drops.

In step 440: post-heating an area in the object region of the current production layer to a second temperature. For example, induction heating unit 30 may be provided with a third electric power level for post-heating areas of the current production layer 7.

Optionally, additional post-treatment activities may be carried out in step 440, for example, the addition of materials, surface alignment or flattening, cooling, and more.

In some embodiments, at least one of the provided power level, the duration, the distance between layer 7 and the lower surface of induction heating unit 30, the tilting angle of coil 30, and the planar velocity of platform 40 may be selected to post-heat layer 7 to the predetermined second temperature. In some embodiments, the predetermined second temperature may be higher than the melting temperature of the metal of layer 7. For example, for ferrous alloys, the determined second temperature may be 100° C. above the melting temperature of layer 7. In some embodiments, controller 60 may receive temperature measurements taken from the surface of layer 7 from sensor 50 (e.g., IR camera, pyrometer or other) and may adjust at least one of the provided power level, the duration, the distance between layer 7 and the lower surface of coil 30, the tilting angle of coil 30 and the planar velocity of platform 40 based on the received measurements.

In some embodiments, induction heating unit 30 may preheat the area in the object region of the previous production layer concurrently while heating and melting the tip of the rod.

In some embodiments, induction heating unit 30 may heat the area in the object region of the current production layer concurrently while heating and melting the tip of the rod.

In some embodiments, induction heating unit 30 may heat the area in the object region of the current production layer concurrently while heating and melting the tip of the rod and while preheating the area in the object region of the previous production layer.

In some embodiments, holder 20 may be controlled to provide a vertical movement to the molten metal depositor (for example, rod 5), thus, controlling the distance between a molten tip of rod 5 and areas in the object regions of the current production layer and the previous production layers. In some embodiments, the shorter the distance, the higher the probability of forming a continuous flow. In some embodiments, a required melt flow rate (e.g., amount of molten metal/second) may be determined. In some embodiments, controller 60 may control at least one of: a vertical speed of rod 5 (e.g., by controlling the actuator of holder 20), a current provided to induction heating unit 30, and the power provided to induction heating unit 30, based on the determined melt flow rate.

In some embodiments, a melt flow profile (e.g., continuous flow, drops, etc.) may be determined. In some embodiments, controller 60 may control at least one of: the vertical position of the molten metal depositor (for example, rod 5) for example, by controlling the actuator of holder 20), a vertical speed of the molten metal depositor, a current provided to the induction heating unit(s) and the power provided to the induction heating unit(s), based on the determined melt flow profile.

In some embodiments, the temperature of the tip of rod 5 and/or the temperature of melt 9 may be continuously measured or occasionally measured by sensor 50. In some embodiments, controller 60 may control at least one of the rod's vertical positions, a vertical speed of the rod, a current provided to the coil, and the power provided to the coil based on the measured temperature, for example, to ensure controlled melting of the rod.

In some embodiments, the width of the molten metal line formed along with the progression of PDP unit 10 during the deposition may affect the amount of energy required during preheating. For example, the amount of power provided to induction heating unit 30 for pre-heating the object region of the previous production layer may be determined such that a width of a pre-heated area is wider than the width of a molten metal line deposited on top of the pre-heated area. In a nonlimiting example, the width of a pre-heated area formed by the induction heating unit during pre-heating of the object region of the previous production layer is 5-50% wider than the width of a molten metal area.

In some embodiments, movable platform 40 may planarly move induction heating unit 30 during the post-heating process in order to ensure even post-heating of layer 7. In some embodiments, movable platform 40 may move induction heating unit 30 in the vertical direction in order to ensure optimal magnetic energy coupling between induction heating unit 30 and layer 7. In some embodiments, movable platform 40 may tilt induction heating unit 30 towards or away from layer 7, in the planar movement progression direction in order to optimize the energy coupling. In some embodiments, induction heating unit 30 may be pre-tilted, and platform 40 may provide coil 30 a planar movement.

As would be understood by one skilled in the art, the predetermined first temperature, the melting temperature, and predetermined second temperature are dependent on the type of metal being cast.

In some embodiments, controller 60 may control system 100 (e.g., control movable platform 40 to move induction heating unit 30 during any one of steps 420, 430, and 440 to preheat the entire object region of previous production layer 6, deposit the entire object region of the current production layer 7 and post-heat the entire object region of the current production layer 7.

In some embodiments, system 100 may allow performing steps 420, 430, and 440 in a continuous manner during step 450. For example, the electrical AC power supplied to induction heating unit 30, the height of rod 5 above the inner turn of induction heating unit 30 and the height of induction heating unit 30 above layers 6 and 7, and the speed of the forward motion are adjusted such that the temperature of rod 5 is above the melting temperature, the temperature of areas of previous production layer 6 is at a first pre-determined temperature, and the temperature of areas of current production layer 7 is at a second pre-determined temperature.

In some embodiments, system 100 may allow performing steps 420 and 430 continuously, whereby the electrical AC power supplied to induction heating unit 30, the height of rod 5 above the inner turn of induction heating unit 30, and the height of induction heating unit 30 above layer 6, and the speed of the forward motion are adjusted such that the temperature of rod 5 is above the melting temperature, the temperature of areas in layer 6 is at a first pre-determined temperature. In some embodiments, system 100 may allow performing steps 430 and 440 continuously, whereby the electrical AC power supplied to induction heating unit 30, the height of rod 5 above the inner turn of induction heating unit 30, and the height of induction heating unit 30 above layer 7, and the speed of the forward motion are adjusted such that the temperature of rod 5 is above the melting temperature, the temperature of areas in layer 7 is at a second pre-determined temperature.

Figure 4B:
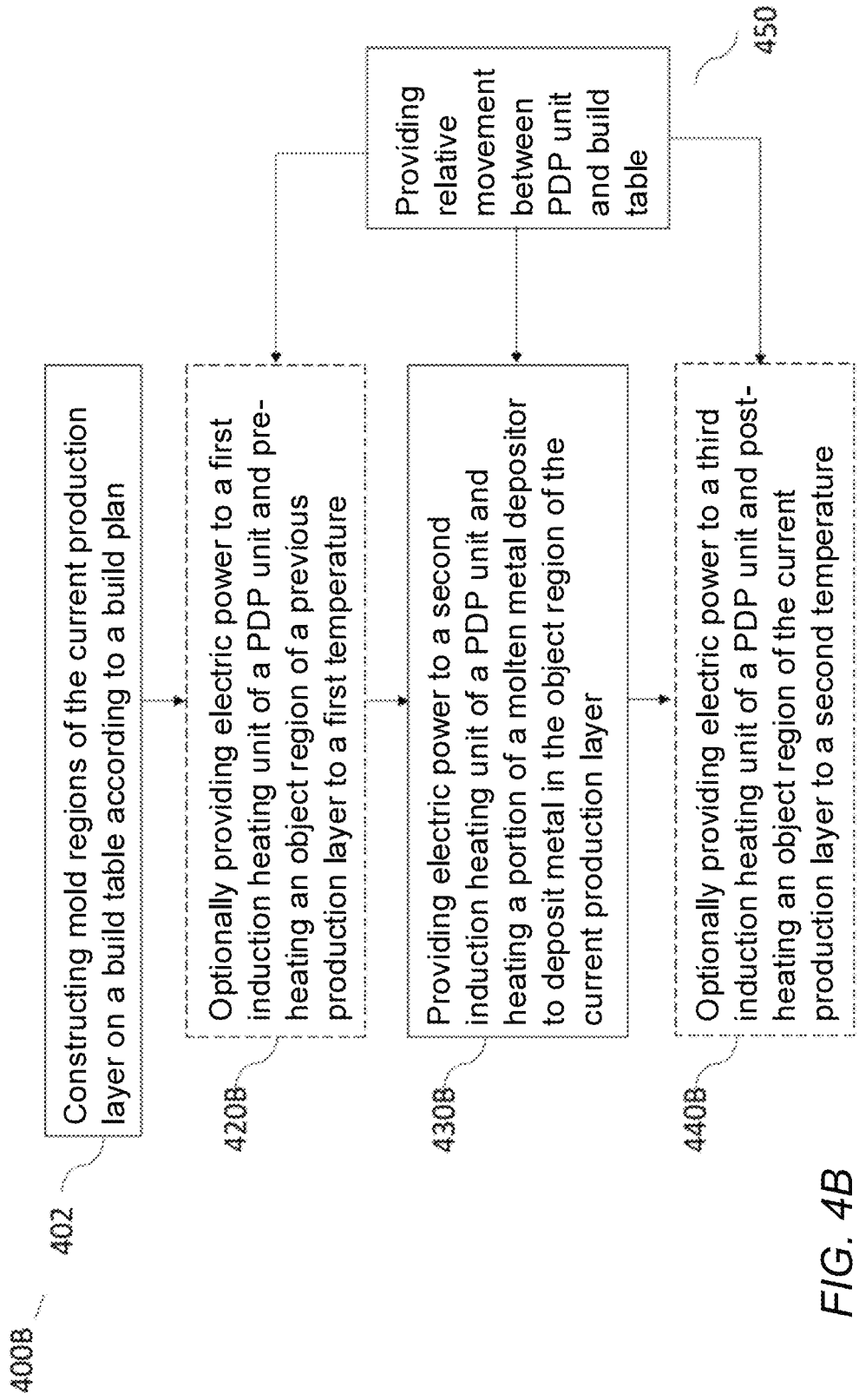

Reference is now made to FIG. 4B, which is a flowchart of a method 400B for the additive casting of metallic objects according to some embodiments of the invention. Method 400B may be performed by system 150 disclosed with reference to FIG. 3A and employing at least three induction heating units 32, 34, and 36.

Thus, method 400B includes, after step 402 of constructing mold regions of the current production layer on a build table following a building plan, and during step 450 of providing relative movement between the PDP unit and a build table:

In step 420B: optionally, providing electric power to a first induction coil of a PDP unit and pre-heating an area in the object region of a previous production layer to a first temperature. For example, controller 60 may control power supply 90 to provide power to first induction coil 32 at a required at least one of current level, current amplitude, current polarity, timing, duration, and current AC frequency.

In step 430B: providing electric power to a second induction coil of a PDP unit and heating a portion of a molten metal depositor to deposit metal on a fabrication area in the object region of the current production layer.

In some embodiments, induction heating unit 32 may be provided with a first electric power level for preheating areas in the previous production layer 6. In some embodiments, movable platform 40 may planarly move induction heating unit 32 during the preheating process in order to ensure even heating of areas in layer 6.

In some embodiments, movable platform 40 may move induction heating unit 32 in the vertical direction in order to ensure optimal magnetic energy coupling between induction heating unit 32 and areas in layer 6. In some embodiments, movable platform 40 may tilt induction heating unit 32 towards or away from layer 6, in the planar movement progression direction in order to optimize the energy coupling. In some embodiments, induction heating unit 32 may be pre-tilted, and platform 40 may provide induction heating unit 32 a planar movement.

In some embodiments, at least one of the provided power level, the duration, the distance between layer 6 (or areas thereof) and the lower surface of induction heating unit 32, the tilting angle of induction heating unit 30, and the planar velocity of the platform 40 may be selected to preheat layer 6 or parts thereof to a predetermined first temperature. In some embodiments, the predetermined first temperature may be higher than the melting temperature of the metal of layer 6. For example, for ferrous alloys, the determined first temperature may be 50° C. above the melting temperature of layer 6. In some embodiments, controller 60 may receive temperature measurements taken from the surface of layer 6 from sensor 50 (e.g., IR camera, pyrometer, or other) and may adjust at least one of the provided power level, the duration, the distance between layer 6 and the lower surface of induction heating unit 32, the tilting angle of induction heating unit 32 and the planar velocity of platform 40 based on the received measurements.

In step 430B, electric power may be provided to a second induction coil for melting metal at the molten metal depositor (e.g., metal rod 5) for depositing the current metallic layer on top of the previous production layer. In some embodiments, power supply 90 may provide a second electric power level to second coil 34 for melting the tip of rod 5. For example, controller 60 may control power supply 90 to provide power to second induction coil 34 as required for at least one of current level, current amplitude, current polarity timing, duration, and current AC frequency.

In some embodiments, the second electric power level may be determined based on the EM energy required to melt the tip of the rod. In some embodiments, additional parameters may control the type of melt flow 9 provided by melting rod 5. Melt 9 may be provided as a continuous, controlled flow of molten metal. Alternatively, melt 9 may be provided in molten drops. In some embodiments, movable platform 40 may planarly move induction heating unit 34 during the deposition process in order to ensure the provision of melt to layer 7.

In some embodiments, holder 20 may be controlled to provide a vertical movement to rod 5, thus, controlling the distance between a molten tip of rod 5 and the previous production layer 6, as discussed above with respect to step 430 of method 400 shown in FIG. 4A. In some embodiments, controller 60 may control at least one of the rod's vertical positions (e.g., by controlling the actuator of holder 20), a vertical speed of the rod, a current provided to the coil and the power provided to the coil, based on the determined melt flow profile and/or measurements received form a sensor, such as sensor 50, as discussed hereinabove.

In step 440B: optionally, providing electric power to a third induction coil of a PDP unit and post-heating an area in the object region of the current production layer to a second temperature. For example, controller 60 may control power supply 90 to provide induction heating unit 36 with a third electric power level for post-heating current production layer 7. In some embodiments, controller 60 may control power supply 90 to provide power to third induction heating unit 36 as required for at least one of current level, current amplitude, current polarity, timing, duration, and current AC frequency.

In some embodiments, movable platform 40 may planarly move induction heating unit 36 during the post-heating process in order to ensure even post-heating of layer 7 or areas thereof. In some embodiments, movable platform 40 may move induction heating unit 36 in the vertical direction in order to ensure optimal magnetic energy coupling between induction heating unit 36 and layer 7. In some embodiments, movable platform 40 may title induction heating unit 36 towards or away from layer 7, in the planar movement progression direction in order to optimize the energy coupling. In some embodiments, induction heating unit 36 may be pre-tilted, and platform 40 may provide coil 36 a planar movement.

In some embodiments, at least one of the provided power level, the duration, the distance between layer 7 and the lower surface of induction heating unit 36, the tilting angle of induction heating unit 36 and the planar velocity of platform 40 may be selected to post-heat layer 7 or areas thereof to the predetermined second temperature. In some embodiments, the predetermined second temperature may be higher than the melting temperature of the metal of layer 7. For example, for ferrous alloys, the determined first temperature may be 100° C. above the melting temperature of layer 7. In some embodiments, controller 60 may receive temperature measurements taken from the surface of layer 7 from sensor 50 (e.g., IR camera, pyrometer or other) and may adjust at least one of the provided power level, the duration, the distance between layer 7 and the lower surface of induction heating unit 36, the tilting angle of induction heating unit 36 and the planar velocity of platform 40 based on the received measurements.

In some embodiments, system 150 may allow performing steps 420B, 430B, 440B continuously while performing step 450 such that induction heating unit 32 is leading the progression of PDP unit 15 optionally preheating layer 6 or areas thereof, followed by induction heating unit 36, which continuously melts the tip of rod 5 and deposit melt 9. In some embodiments, the as-deposited object regions of the current production layer 7 may immediately be post heated by induction heating unit 36. Therefore, in a single run over the build table, system 150 may perform optional preheating, depositing, and optional post-heating of layers 6 and 7.

In some embodiments, controller 60 may control system 150 to optionally preheat the entire object region of layer 6, then deposit the entire object region of layer 7, and then optionally post-heat the entire object region of layer 7. Alternatively, controller 60 may control system 150 to optionally preheat an area of the previous production layer 6 (e.g., a single line), then deposit first portion (e.g., a line) of layer 7 and post-heat the deposited first portion layer 7, repeating the process for additional areas.

In some embodiments, steps 402-450 may be repeated in order to cast a 3D metallic object layer by layer.

Figure 5:
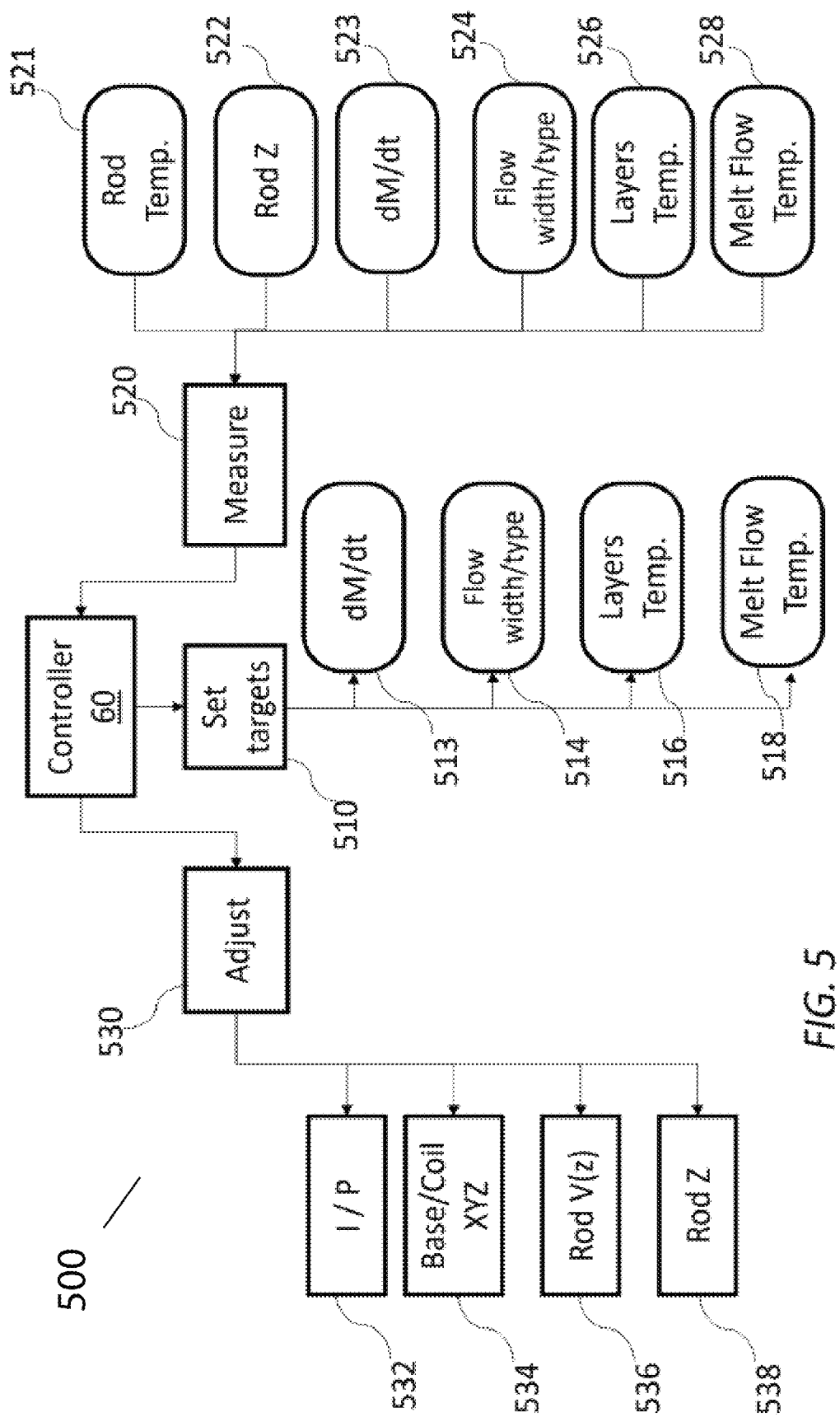
FIG. 5 is a detailed flowchart of a method for controlling the systems for the additive casting of metallic objects according to some embodiments of the invention.

Reference is now made to FIG. 5, which is a flowchart of a method 500 of controlling the systems for the additive casting of metallic objects according to some embodiments of the invention. In some embodiments, method 500 may be performed by controller 60 included in both systems 100 and 150. In step 510, controller 60 may set target values for various casting parameters. For example, controller 60 may set a target mass flow rate dM/dt for depositing melt 9, in step 513. In another example, controller 60 may set the type of flow (e.g., continuous, drops, etc.) in step 514. In yet another example, in step 516, controller 60 may set any one of the required first temperature for preheating layer 6 or areas thereof and/or the second temperature for post-heating layer 7 or areas thereof. In some embodiments, in step 518, controller 60 may set the temperature required for melt flow 9.

In step 520, controller 60 may receive measurements from one or more sensors. For example, controller 60 may receive the temperature of the tip of rod 5 in step 521. In another example, in step 522, controller 60 may receive the vertical position/vertical velocity of rod 5 (e.g., from the actuator of holder 20) with respect to build table 4. In step 523, controller 60 may receive mass flow rate dM/dt measurements from weight sensor 54, for example, by temporal measuring the weight of rod 9 and/or build table 4. In step 524, controller 60 may receive from the camera 52 images of the melt flow. In some embodiments, using known images analysis methods, controller 60 may determine the type and or width of the melt flow. In step 526, controller 60 may receive temperature measurements of layer 6 and or layer 7, for example, from sensor 50. In step 528, controller 60 may receive temperature measurements of the melt flow 9, for example, from sensor 50.

In step 530, controller 60 may compare the parameters measured in step 520 to the required parameters set in step 510. In some embodiments, controller 60 may adjust one or more operational parameters of systems 100 and/or 150 based on the comparison. Controller 60 may increase/decrease the vertical distance between the coils and/or the rod and the layers in order to increase/decrease the temperature. In some embodiments, controller 60 may increase/decrease the power provided to the coils. For example, controller 60 may adjust the power/current of at least one of the first power level, the second power level, and the third power level in step 532. In another example, controller 60 may control the movement (e.g., planar/vertical) of PDP units 10 or 15 by controlling movable platform 40 and/or build table 4, in step 534). In yet another example, controller 60 may control the vertical velocity (step 536) and/or the vertical position (step 538) of rod 5, by controlling the actuator of holder 20.

Heating a fabrication area (including heating of multiple fabrication areas) includes heating to pre-deposition temperature at or above the melting temperature of the metallic object to thereby create the melt pool of molten metal in the fabrication areas before depositing metal on the multiple fabrication areas to affect a bonding of the molten metal with the multiple fabrication areas, wherein each of the fabrication areas is maintained at an inert environment before and during metal deposition.

The casting method may further include heating the multiple fabrication areas to a post-deposition target temperature after depositing metal on the multiple fabrication areas to affect a thermal cooling profile of the multiple working areas.

According to an aspect of the invention, there is provided a casting system for casting a metallic object by constructing a plurality of production layers forming a vertical stack, wherein production layers of the plurality have mold regions, wherein production layers of the plurality have object regions defined by the mold regions, and wherein a current production layer is constructed upon a top surface of a previous production layer of the vertical stack, the system comprising: a mold construction unit operative to construct a mold region of the current production layer; a Preparation-Deposition-Post treatment (PDP) unit including: a molten metal depositor operative to deposit molten metal in an object region defined by the mold region of the current production layer; a holder attached to the molten metal depositor, for holding the molten metal depositor; at least one induction heating unit attached to the holder; a build table, for supporting the vertical stack of production layers; a movable platform to provide relative movement between the PDP unit and the build table, wherein the relative movement is along a progression direction; an inert gas unit for maintaining at least a fabrication area of the object region of the current production layer at an inert environment before and during molten metal deposition and a controller for controlling the PDP unit and the movable platform to deposit molten metal in the fabrication area, and to control the PDP unit to perform at least one of: (1) pre-heating the fabrication area before molten metal deposition, to a pre-deposition temperature, and (2) post-heating the fabrication area after molten metal deposition, to a post-deposition temperature.

According to an aspect of the invention, there is provided a casting method for additively casting of a metallic object by producing multiple production layers having mold regions and object regions defined by the mold regions, one current production layer after the other, comprising: constructing a mold region of the current production layer before producing the object region of the current production layer; moving along a progression direction a Preparation-Deposition-Post treatment (PDP) unit including: a molten metal depositor operative to deposit molten metal in an object region defined by the mold region of the current production layer; a holder attached to the molten metal depositor, for holding the molten metal depositor, and at least one induction heating unit attached to the holder; depositing molten metal at a pre-determined deposition temperature in multiple fabrication areas at the object region of the current production layer according to a building plan; and heating the multiple fabrication areas, wherein heating the multiple fabrication areas comprises heating the multiple fabrication areas to a target pre-deposition temperature equal to or above a melting temperature of the metallic object to thereby create a melt pool of molten metal in the fabrication areas before depositing metal on the multiple fabrication areas to affect a bonding of the molten metal with the multiple fabrication areas, wherein each of the fabrication areas is maintained at an inert environment before and during metal deposition.

The PDP unit was described in the context of its use for metal deposition within cavities of mold regions. However, the use of the PDP unit is not limited thereto. The PDP unit may be used for casting metallic objects using molds or mold regions that are not constructed on the same production layer as the object regions. The PDP unit may be used for casting metallic objects without any molds at all.

Thus, according to an aspect of the invention, there is provided a Preparation-Deposition-Post treatment (PDP) unit for additive metal casting, the PDP unit may comprise: a molten metal depositor operative to deposit molten metal in a fabrication region; a holder attached to the molten metal depositor, for holding the molten metal depositor; at least one induction heating unit attached to the holder; a movable platform to provide relative movement for the PDP unit along a progression direction; and a controller for controlling the PDP unit and the movable platform to deposit molten metal in a fabrication area, and to control the PDP unit to perform at least one of: (1) pre-heating the fabrication area before molten metal deposition, to a pre-deposition temperature, and (2) post-heating the fabrication area after molten metal deposition, to a post-deposition temperature.

The controller may be operative to control the at least one induction heating unit to heat a portion of the molten metal depositor. The controller may be operative to control the at least one induction heating unit to create a melt pool in an upper surface of metal in the fabrication area. The controller may be operative to control the at least one induction heating unit to affect one or more of: (1) a thermal parameter of the melt pool, (2) a thermal parameter of the fabrication area, and (3) a cooling profile of the fabrication area. The controller may be operative to provide electric power to the at least one induction heating unit.

The controller may be operative to change a working distance of the PDP unit above the fabrication area. The controller may be operative to change a working distance above the fabrication area of one or more of (1) the molten metal depositor, (2) the holder, and (3) the at least one induction heating unit.

The at least one induction heating unit may have, with respect to the progression direction, a leading section and a trailing section, and wherein, along the progression direction, the leading section is operative to pre-heat the fabrication area before molten metal deposition and the trailing section is operative to post-heat the fabrication area after molten metal deposition. The at least one induction heating unit may comprise a magnetic induction coil having a shape selected from a group consisting of: (1) a substantially circular planar shape; (2) a substantially elliptical planar shape with a major axis parallel to the progression direction; (3) a substantially elliptical planar shape with a major axis perpendicular to the progression direction; (4) a substantially conical shape oriented during operation so that an apex thereof is closer to the fabrication area than a base thereof is to the fabrication area. The at least one induction heating unit may comprise a magnetic induction coil with a plurality of windings having a first density of windings in a first portion of the at least one induction heating unit and a second density of windings in a second portion of the at least one induction heating unit, and wherein the second density is greater than the first density. The at least one induction heating unit may have a central axis that is perpendicular to a build table or is tilted at a predetermined angle with respect to the build table during operation.

The molten metal depositor may comprise a molten metal source selected from a group consisting of: (1) a metal rod, wherein the at least one induction heating unit is operative to melt a tip of the metal rod; and (2) a crucible operative to contain molten metal and wherein the at least one induction heating unit is operative to maintain the molten metal in the molten state.

The PDP unit may further comprise a molten metal feeder for providing molten metal to the molten metal depositor.

According to an aspect of the invention, there is provided a casting method for using a Preparation-Deposition-Post Treatment (PDP) unit having a molten metal depositor, a holder for the PDP unit, and at least one induction heating unit attached to the holder, to cast a metallic object, the method comprising: providing relative movement of the PDP unit; providing electric power to the at least one induction heating unit, for: heating the molten metal depositor to deposit molten metal on a fabrication area; and performing at least one of: before depositing molten metal, pre-heating the fabrication area to a first temperature, and after depositing molten metal, post-heating the fabrication area to a second temperature.

The casting method may further comprise one or more of: (1) providing relative vertical movement of the molten metal depositor and controlling a distance between the molten metal depositor and a fabrication area; (2) determining a required molten metal deposition rate; (3) controlling at least one of a speed and a direction of relative movement of the PDP unit; (4) determining a molten metal deposition profile, and controlling at least one of: a vertical position of the molten metal depositor, a speed of the molten metal depositor, and an electrical power level provided to the at least one induction heating unit, wherein the controlling is based on the molten metal deposition profile; (5) measuring a temperature of a portion of the molten metal depositor and controlling at least one of: the vertical position of the molten metal depositor, a speed of the molten metal depositor, and an electrical power level provided to the at least one induction heating unit, wherein the controlling is based on the measured temperature; and (6) post-heating the fabrication area.

The invention was discussed with reference to pre-processing and post-processing implemented with induction heating. The invention is not limited to induction heating and other heating techniques may be used, employing, for example, plasma or torch.

As used throughout the specification, the terms "metal" or "metallic" refers to any metals and/or mellitic alloys which are suitable for melting and casting, for example, ferrous alloys, aluminum alloys, copper alloys, nickel alloys, magnesium alloys, and the like. The present invention is not limited by the type of cast material and is applicable to the additive casting of other metals, including gray iron, ductile iron, and steel.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Appendix—Metallurgical Evaluation

FIG. 6A through FIG. 6F depict results of a metallurgical evaluation conducted on coupons of cast objects produced according to an embodiment of the invention.

Three cast metal objects were produced for the evaluation—respectively labeled 1, 2, and 3. These were cut as vertical slices from a cast cube of metal 15 cm on each edge. Casting the cube was carried out in an atmosphere with controlled oxygen content. The base layer was a 15 cm×15 cm square of sintered alumina ceramic 0.5 cm thick. Metal was additively deposited in a vertical stack of sequential layers inside a mold cavity formed by a 15 cm×15 cm hollow square frame mold of sintered alumina ceramic. Deposition and heating were performed by a movable heating and dispensing unit in a raster scan pattern.

Figures 6A, 6B, 6C:
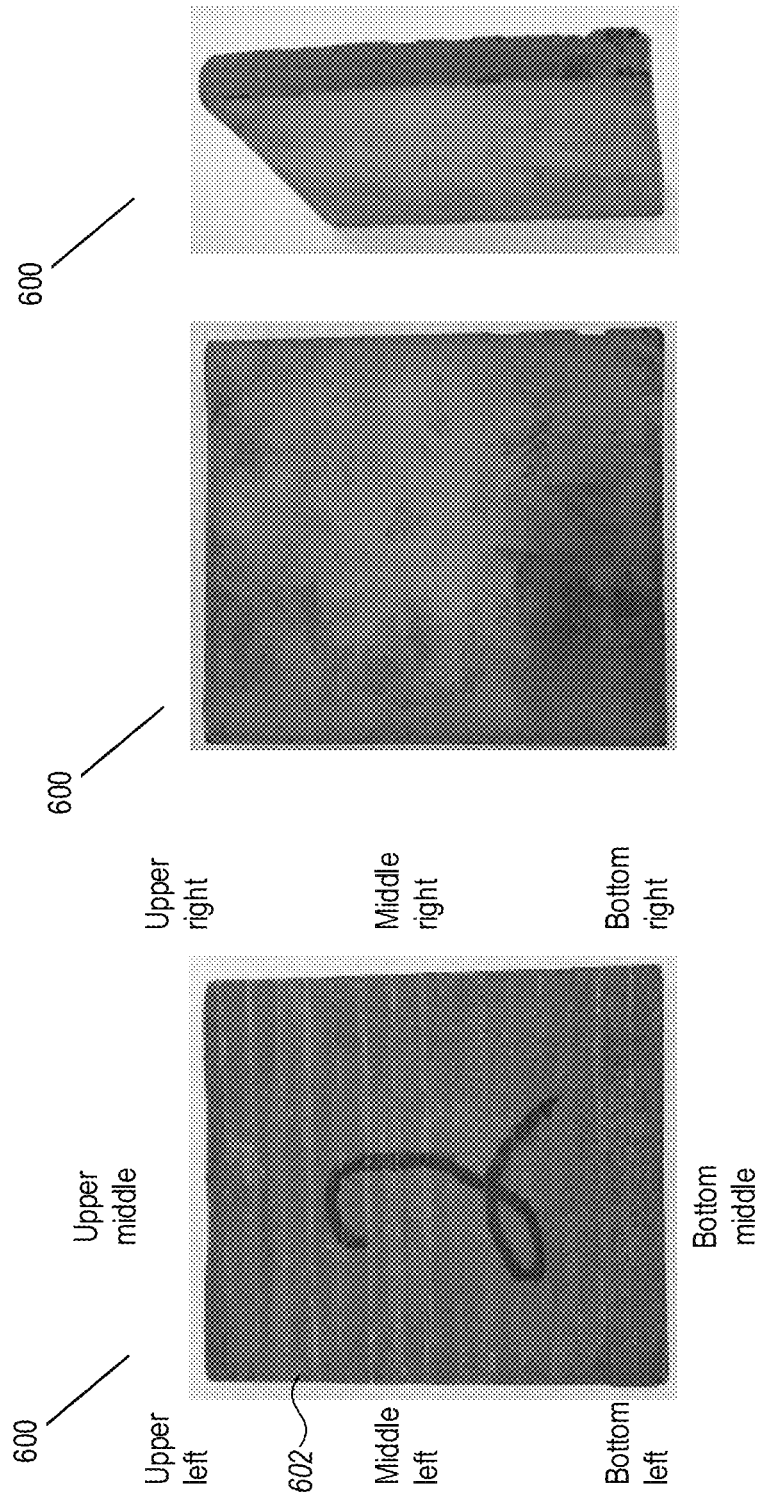

FIG. 6A is a photograph of slice 2. This side was originally an outside face of the cast cube (the x-z plane), and this surface was not given any finishing treatments—the faint horizontal lines visible in FIG. 6A, for example, are impressions made by the mold.

FIG. 6B is a photograph showing the back side of slice 2. This was the inner side of slice 2, and it was polished after being sliced from the cube. FIG. 6C is a photographic perspective view of slice 2. The smoothness of the polished face is visible in this view.

Objects 1 and 3 were cut into metal coupons: horizontal bottom coupons (left, center, right); horizontal top coupons (left, center, right), and vertical coupons (left, center, right). The coupons have a gauge length of 32 mm, total length between 65-70 mm, thickness in the range 1.8-2.45 mm, and width in the range of 4.9-5.5 mm.

Elemental analysis, mechanical, and strength testing of 18 coupons from the cast labeled 1, and 17 coupons from the cast labeled 3 were conducted.

Elemental analysis was performed with XRF spectroscopy. Only principal alloying components were analyzed to validate the difference or similarity of the different coupons in a cast and between casts 1 and 3. The table in FIG. 6D depicts the elemental analysis of representative coupons. The elemental analysis validated the similarity between upper and bottom coupons, left, middle and right coupons, and cast 1 and 3 coupons.

Mechanical and strength testing was performed on a Servo hydraulic tension testing machine MTS 370.10. The strain rate applied was 0.14 min-1. An extensometer of base length 25 mm was used to measure strain data and remained attached on the coupons until fracture.

Figure 6E:
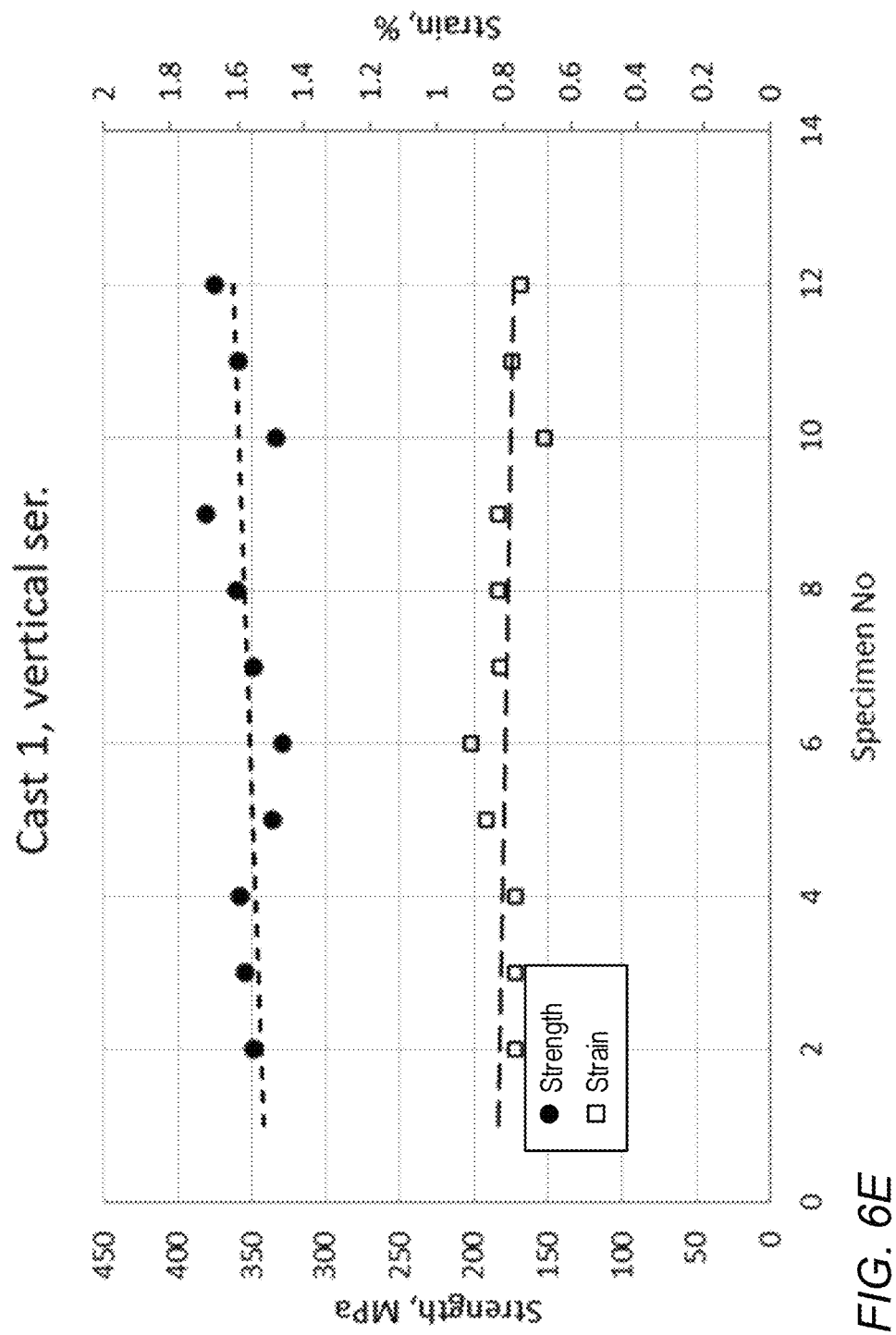
Figure 6F:
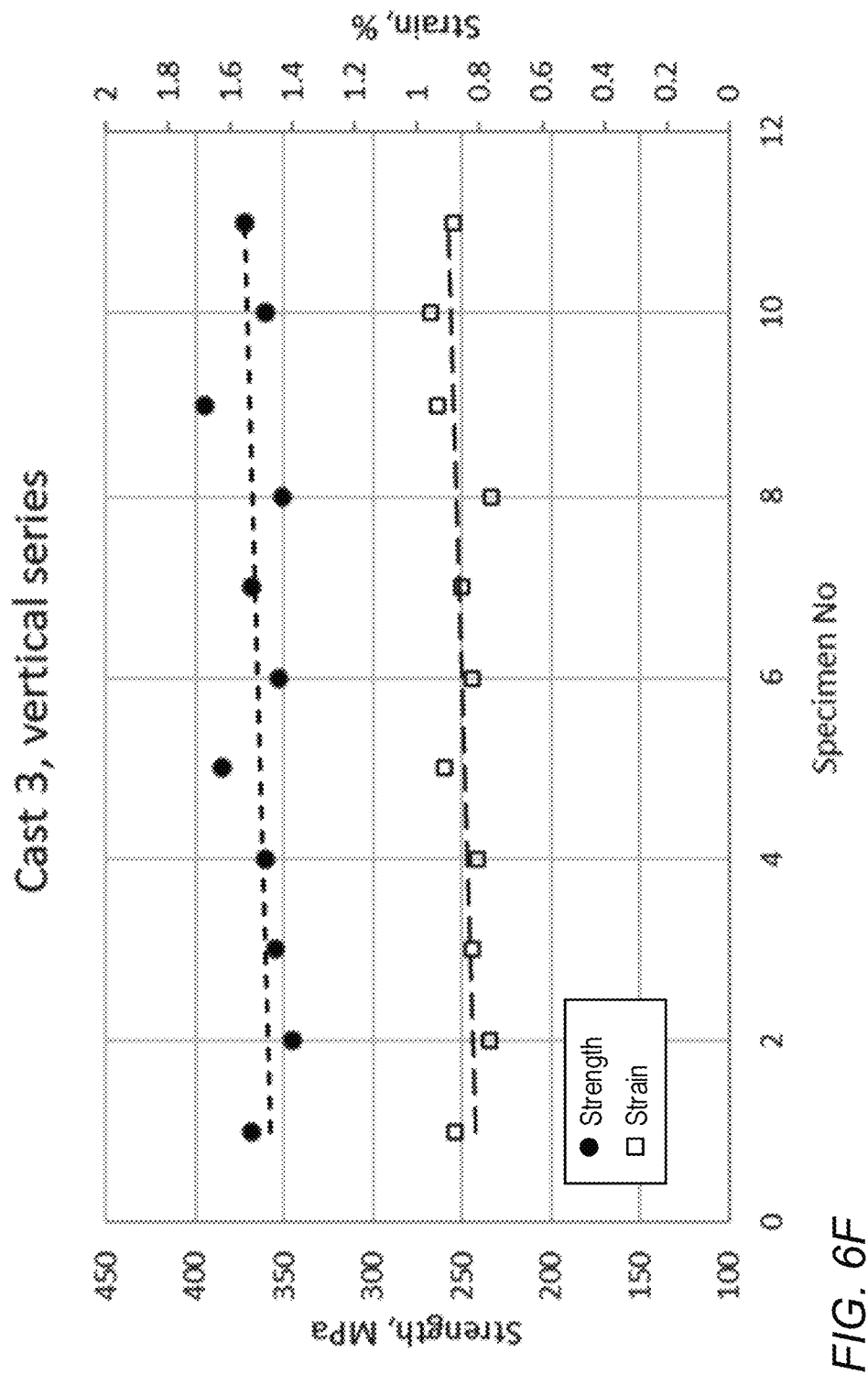

FIG. 6E and FIG. 6F are stress-strain charts for all the coupons. The stress-strain charts have a similar appearance, typical for cast iron. The mechanical strength testing validated the similarity between upper and bottom coupons, left, middle and right coupons, and cast 1 and 3 coupons.

Overall, no significant difference between analyzed parts 1 and 3 was revealed, showing a high level of uniformity in the mechanical properties of the cast parts.

What is claimed is:

1. A casting system for casting a metallic object by constructing a plurality of production layers forming a vertical stack, wherein production layers of the plurality of production layers have mold regions, wherein production layers of the plurality of production layers have object regions bounded by the mold regions, and wherein a current production layer is constructed upon a top surface of a previous production layer of the vertical stack, the system comprising:

a mold construction unit operative to construct a mold region of the current production layer, the mold region having a mold height;

a Preparation-Deposition-Post treatment (PDP) unit including:

a holder;

at least one surface induction heating unit attached to the holder and having a hole therein, the at least one surface induction heating unit being operative to heat at least a portion of previously-deposited metal in the object region bounded by the mold region of the current production layer;

a molten metal depositor attached to the holder and operative to melt a portion of a metal rod to provide a melt flow of molten metal from above the mold height, through the hole in the at least one surface induction heating unit and into the object region bounded by the mold region of the current production layer; and the holder to hold the molten metal depositor and the at least one surface induction heating unit together in pre-defined locations for combined movement above the top surface;

a build table for supporting the vertical stack of production layers; and a movable unit attached to the PDP unit and operative to move the PDP unit with respect to the build table.

2. The casting system of claim 1 and also comprising a controller for controlling the PDP unit and the movable unit and wherein the controller is operative to control the at least one surface induction heating unit to heat a portion of the metal rod.

3. The casting system of claim 1 and also comprising a controller for controlling the PDP unit and the movable unit and for performing the following:
   to control the at least one surface induction heating unit to create a current melt pool in the top surface of metal in the current fabrication area;
   to control the molten metal depositor to deposit a portion of the melt flow into the current melt pool; and
   to control the at least one surface induction heating unit to post-heat the current fabrication area to a post-deposition temperature.

4. The casting system of claim 3 wherein the controller is operative to control the at least one surface induction heating unit to affect one or more of:
   (1) a thermal parameter of the current melt pool,
   (2) a thermal parameter of the current fabrication area, and
   (3) a cooling profile of the current fabrication area.

5. The casting system of claim 1 wherein the at least one surface induction heating unit has, with respect to the progression direction, a leading section and a trailing section, and wherein, along the progression direction, the leading section is operative to heat the current fabrication area before molten metal deposition and the trailing section is operative to post-heat the current fabrication area after molten metal deposition.

6. The casting system of claim 1 and also comprising a controller for controlling the PDP unit and the movable unit and wherein the controller is operative to change a working distance of the PDP unit above the current fabrication area and wherein the working distance corresponding to the current fabrication area is larger than the mold height.

7. The casting system of claim 6 wherein the controller is operative to change a working distance above the current fabrication area of one or more of
   (1) the molten metal depositor,
   (2) the metal rod;
   (3) the holder, and
   (4) the at least one surface induction heating unit.

8. The casting system of claim 1 wherein the at least one surface induction heating unit comprises a magnetic induction coil having a shape selected from a group consisting of:
   (1) a substantially circular planar shape;
   (2) a substantially elliptical planar shape with a major axis parallel to the progression direction;
   (3) a substantially elliptical planar shape with a major axis perpendicular to the progression direction; and
   (4) a substantially conical shape oriented during operation so that an apex thereof is closer to the current fabrication area than a base thereof is to the fabrication area.

9. The casting system of claim 1 wherein the at least one surface induction heating unit comprises a magnetic induction coil with a plurality of windings having a first density of windings in a first portion of the at least one surface induction heating unit and a second density of windings in a second portion of the at least one surface induction heating unit, and wherein the second density is greater than the first density.

10. The casting system of claim 1 wherein the at least one surface induction heating unit has a central axis that is perpendicular to the build table or is tilted at a predetermined angle with respect to the build table during operation.

11. The casting system of claim 3 wherein the controller is operative to provide electric power to the at least one surface induction heating unit, wherein providing electric power comprises controlling at least one of: current, voltage, polarity, timing, duty cycle, power factor, alternating current frequency, and alternating current phase.

12. The casting system of claim 1 further comprising a rod feeder for providing a new rod to the molten metal depositor.

13. The casting system of claim 1 further comprising a production chamber to accommodate the build table, the mold construction unit, and the PDP unit during production layer fabrication, wherein the production chamber is maintained at a first temperature during mold region production and at a second temperature, different from the first temperature, during molten metal deposition.

14. The casting system of claim 3 wherein the current fabrication area is maintained in an inert atmospheric environment in a production chamber during PDP unit operation.

15. The casting system of claim 1 wherein the portion of the melt flow is one of: a drop, and a plurality of drops.

16. The casting system of claim 1 wherein said metal rod is formed of one of: grey iron, ductile iron or steel.

17. The casting system of claim 1 wherein the holder comprises a rotator to rotate the rod within the depositor thereby to produce even melting of said rod.

18. The casting system of claim 1 wherein the holder comprises an actuator to lift the rod outside a heating area of said at least one induction surface heating unit.

* * * * *